US012140880B2

(12) United States Patent
Furuta

(10) Patent No.: US 12,140,880 B2

(45) Date of Patent: Nov. 12, 2024

(54) IMAGE-FORMING APPARATUS, CORRECTION CHART, AND METHOD

(71) Applicant: CANON KABUSHIKI KAISHA, Tokyo (JP)

(72) Inventor: Yasutomo Furuta, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/458,430

(22) Filed: Aug. 30, 2023

(65) Prior Publication Data

US 2024/0069463 A1 Feb. 29, 2024

(30) Foreign Application Priority Data

Aug. 31, 2022 (JP) ................................ 2022-138341

(51) Int. Cl.

*G03G 15/043* (2006.01)

*G03G 15/00* (2006.01)

(Continued)

(52) U.S. Cl.

CPC ......... *G03G 15/043* (2013.01); *G03G 15/011* (2013.01); *G03G 15/04054* (2013.01);

(Continued)

(58) Field of Classification Search

CPC ............ G03G 15/043; G03G 15/0407; G03G 15/5041; G03G 15/5058; G03G 15/011; G03G 15/04054

See application file for complete search history.

(56) References Cited

U.S. PATENT DOCUMENTS

2013/0163055 A1* 6/2013 Herloski ............ G03G 15/5062 358/474

2019/0005362 A1 1/2019 Kuo et al.

(Continued)

FOREIGN PATENT DOCUMENTS

JP 2005-271351 A 10/2005

JP 2007-137019 A 6/2007

(Continued)

OTHER PUBLICATIONS

Office Action dated Sep. 6, 2024, in Japanese Patent Application No. 2022-138341.

*Primary Examiner* — Joseph S Wong

(74) *Attorney, Agent, or Firm* — Venable LLP

(57) ABSTRACT

An image-forming apparatus includes a generating unit that generates correction data for correcting an unevenness in light amount of an exposure head using a read image of a correction chart, and a correction unit that corrects image data for image formation based on the correction data. The exposure head includes light-emitting chips, each of which includes light-emitting elements. The correction chart includes a plurality of regions arranged in a direction, a first reference mark located on one side of the regions, and a second reference mark located on the other side of the regions. The generating unit determines partial regions respectively formed by the light-emitting chips within the regions based on positions of the first and second reference marks in the read image of the correction chart, and generates the correction data based on a result of measurement on the partial regions.

11 Claims, 14 Drawing Sheets

(51) Int. Cl.
*G03G 15/01* (2006.01)
*G03G 15/04* (2006.01)

(52) U.S. Cl.
CPC ..... *G03G 15/5041* (2013.01); *G03G 15/5058* (2013.01); *G03G 2215/0407* (2013.01)

(56) References Cited

U.S. PATENT DOCUMENTS

| | | | | |
|---|---|---|---|---|
| 2022/0091532 | A1 | 3/2022 | Arai et al. | |
| 2023/0273544 | A1* | 8/2023 | Seki | G03G 15/043 399/51 |
| 2023/0305426 | A1* | 9/2023 | Furuta | G03G 15/04045 |

FOREIGN PATENT DOCUMENTS

| | | | |
|---|---|---|---|
| JP | 2009-056796 | A | 3/2009 |
| JP | 2010-234685 | A | 10/2010 |
| JP | 2012-108198 | A | 6/2012 |
| JP | 2018-001679 | A | 1/2018 |
| JP | 2022-053038 | A | 4/2022 |

* cited by examiner

IMAGE-FORMING APPARATUS, CORRECTION CHART, AND METHOD

BACKGROUND OF THE INVENTION

Field of the Invention

The present invention relates to an image-forming apparatus, a correction chart, and a method.

Description of the Related Art

As a type of electrophotographic image-forming apparatus, an apparatus that uses a solid-state exposure method is commonly known, in which a latent image is formed by exposing a photosensitive drum with light emitted by LEDs (e.g., organic EL elements) instead of laser light. An exposure head of this type of apparatus includes a light-emitting element set that includes a plurality of light-emitting elements arranged parallel with an axial direction of the photosensitive drum, and a rod lens array that focuses light from the light-emitting element set on a surface of the photosensitive drum. Japanese Patent Laid-Open No. 2018-1679 discloses a method in an image-forming apparatus that uses the solid-state exposure method for correcting, based on a result of reading a test chart, an unevenness (unevenness in light amount) in an image due to a light amount difference between a plurality of light-emitting chips each having a light-emitting element set.

SUMMARY OF THE INVENTION

However, with the correction method disclosed by Japanese Patent Laid-Open No. 2018-1679, recognition accuracy of sections included in the test chart that correspond to the light-emitting chips might be insufficient, resulting in inability to favorably correct the unevenness in light amount. Factors that cause an unevenness in light amount may include not only an error per light-emitting chip, but also an error in lenses in the lens array and individual differences between circuits within a single light-emitting chip. To capture a position of such a local unevenness with high accuracy to correct the unevenness, it is important to be capable of precisely recognizing which part of the chart corresponds to which part of each chip in the exposure head.

In view of the foregoing issue, the present invention aims to provide an improved mechanism for correcting an unevenness in light amount in an image.

According to an aspect, there is provided an image-forming apparatus including: an image-forming unit including a photosensitive member and an exposure head configured to expose the photosensitive member with light in accordance with image data; a generating unit configured to cause the image-forming unit to form an image of a correction chart, and generate correction data for correcting an unevenness in light amount of the exposure head using a read image of the correction chart obtained by optically reading the formed image; and a correction unit configured to correct the image data input to the image-forming unit based on the correction data generated by the generating unit. The exposure head includes a plurality of light-emitting chips located at different positions in a first direction parallel with an axial direction of the photosensitive member, each of the plurality of light-emitting chips including an array of a plurality of light-emitting elements arranged at least in the first direction. The correction chart includes: a plurality of regions arranged in a second direction perpendicular to the first direction and having different gradations, at least one first reference mark located on one side of the plurality of regions in the second direction and indicating a boundary between adjoining light-emitting chips among the plurality of light-emitting chips, and at least one second reference mark located on the other side of the plurality of regions in the second direction and indicating the boundary between adjoining light-emitting chips among the plurality of light-emitting chips. The generating unit is configured to determine partial regions respectively formed by the plurality of light-emitting chips within the plurality of regions based on positions of the first reference mark and the corresponding second reference mark in the read image of the correction chart, and generate the correction data based on a result of measuring a density in each of the determined partial regions.

Further features of the present invention will become apparent from the following description of exemplary embodiments (with reference to the attached drawings).

DESCRIPTION OF THE EMBODIMENTS

Figure 1:
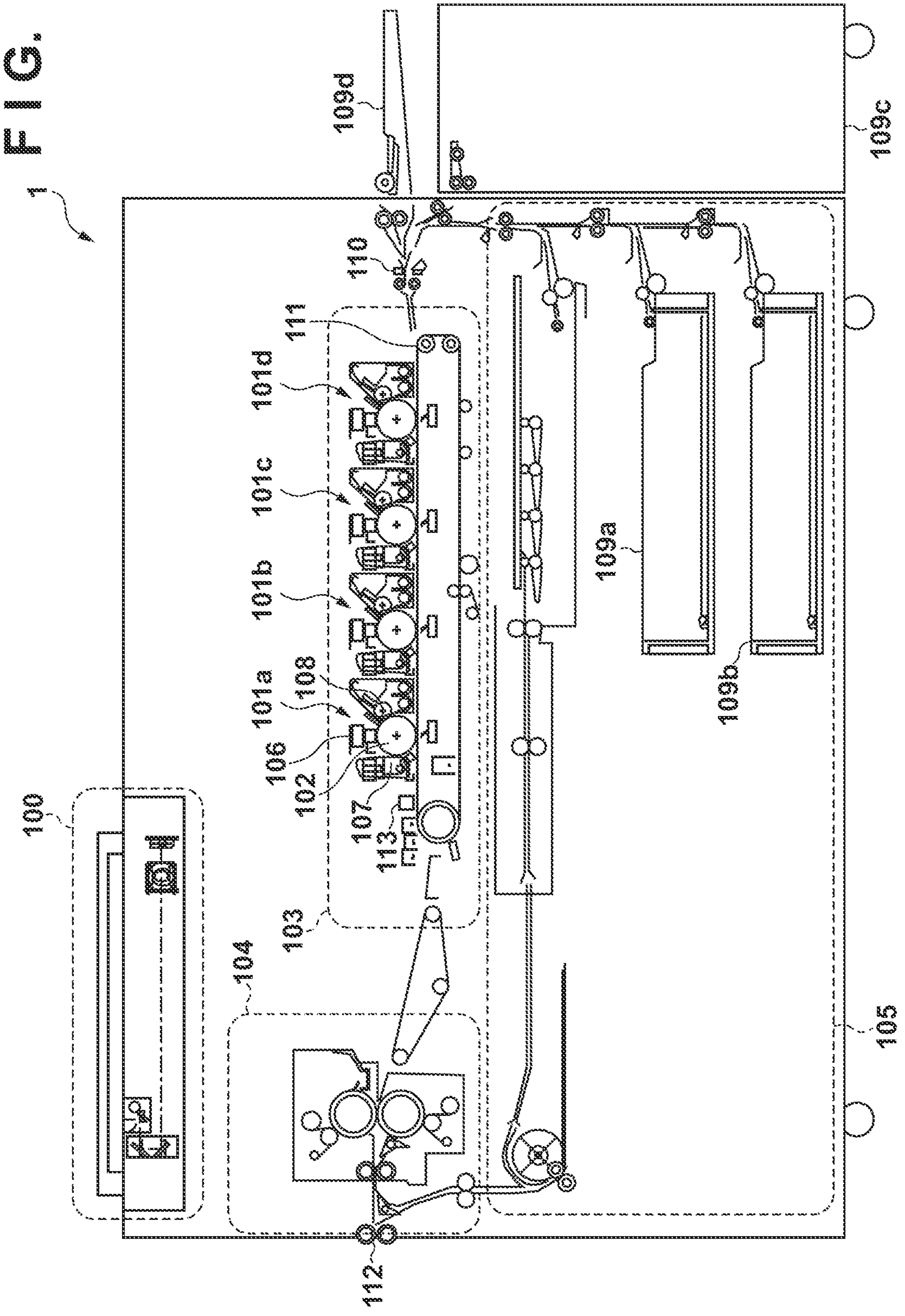
FIG. 1 is a configuration diagram showing a schematic configuration of an image-forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. SCHEMATIC CONFIGURATION OF IMAGE-FORMING APPARATUS

FIG. 1 shows an example of a schematic configuration of an image-forming apparatus 1 according to an embodiment. The image-forming apparatus 1 includes a reading unit 100, an image-making unit 103, a fixing unit 104, and a transport unit 105. The reading unit 100 optically reads an original placed on a platen and generates read image data. The image-making unit 103 forms an image on a sheet based on the read image data generated by the reading unit 100 or based on print image data received from an external device via a network, for example.

The image-making unit 103 includes image-forming units 101*a*, 101*b*, 101*c*, and 101*d*. The image-forming units 101*a*, 101*b*, 101*c*, and 101*d* form toner images in black, yellow, magenta, and cyan, respectively. The image-forming units 101*a*, 101*b*, 101*c* and 101*d* have the same configuration, and are also referred to collectively as image-forming units 101 below. A photosensitive member 102 of each image-forming unit 101 is driven to rotate in the clockwise direction in the figure during image formation. A charger 107 electrically charges a corresponding photosensitive member 102. An exposure head 106 exposes a corresponding photosensitive member 102 with light in accordance with image data to form an electrostatic latent image on a surface of the photosensitive member 102. A developer 108 develops the electrostatic latent image on the surface of the photosensitive member 102 with toner to form a toner image. The toner image formed on the surface of the photosensitive member 102 is transferred to a sheet that is being transported on a transfer belt 111. A color image containing four color components, namely, black, yellow, magenta, and cyan, can be formed by transferring the toner images of the four photosensitive members 102 to the sheet in a superimposed manner.

The transport unit 105 controls feed and transport of sheets. Specifically, the transport unit 105 feeds a sheet from a unit designated from among internal storage units 109*a* and 109*b*, an external storage unit 109*c*, and a manual feed unit 109*d* to a transport path in the image-forming apparatus 1. The fed sheet is transported to a registration roller 110. The registration roller 110 transfers the sheet onto the transfer belt 111 at an appropriate timing such that the toner image of each photosensitive member 102 is transferred to the sheet. As mentioned above, the toner images are transferred to the sheet while the sheet is transported on the transfer belt 111. The fixing unit 104 fixes the toner images to the sheet by heating and pressurizing the sheet to which the toner images have been transferred. After the toner images have been fixed, the sheet is discharged to outside the image-forming apparatus 1 by a discharge roller 112. An optical sensor 113 is located at a position facing the transfer belt 111. The optical sensor 113 is used to detect a misalignment (color misalignment) between color components in a test image formed on the transfer belt 111 by the image-forming units 101. If a color misalignment is detected, the image-forming positions of the image-forming units 101*a*, 101*b*, 101*c*, and 101*d* are corrected so as to compensate for the detected color misalignment under the control of a later-described image controller 800.

Although an example in which the toner image is directly transferred from each photosensitive member 102 to the sheet on the transfer belt 111 has been described here, the toner image may alternatively be transferred indirectly from each photosensitive member 102 to the sheet via an intermediate transfer member. Further, although an example of forming a color image using toner of multiple colors has been described here, the technology according to the present disclosure is also applicable to an image-forming apparatus that forms a monochrome image using toner of a single color.

2. CONFIGURATION EXAMPLE OF EXPOSURE HEAD

Figure 2A:
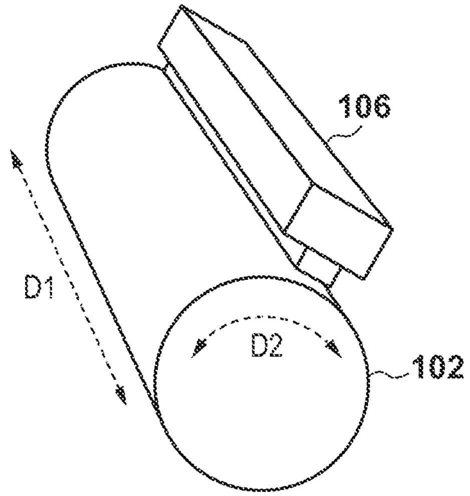
FIG. 2A is a first illustrative diagram showing a configuration of a photosensitive member and an exposure head according to an embodiment.
Figure 2B:
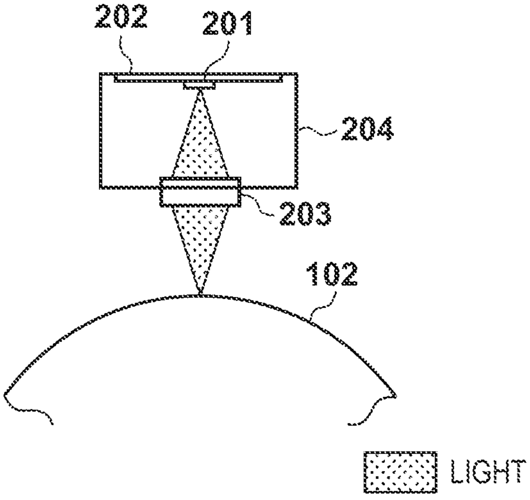
FIG. 2B is a second illustrative diagram showing a configuration of the photosensitive member and the exposure head according to an embodiment.

FIGS. 2A and 2B show the photosensitive member 102 and the exposure head 106. The exposure head 106 includes a light-emitting element set 201, a printed circuit board 202 on which the light-emitting element set 201 is mounted, a rod lens array 203, and a housing 204 for attaching the rod lens array 203 to the printed circuit board 202. The photosensitive member 102 has a cylindrical shape. The exposure head 106 is located such that the longitudinal direction thereof is parallel with an axial direction D1 of the photosensitive member 102, and a face thereof to which the rod lens array 203 is attached faces the surface of the photosensitive member 102. While the photosensitive member 102 rotates in a circumferential direction D2, the light-emitting element set 201 of the exposure head 106 emits light, and the rod lens array 203 focuses that light onto the surface of the photosensitive member 102.

Figure 3A:
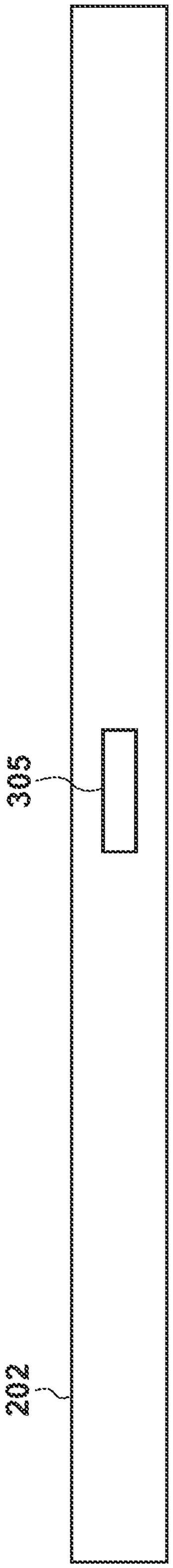
FIG. 3A is a first illustrative diagram showing a configuration of a printed circuit board of the exposure head according to an embodiment.
Figure 3B:
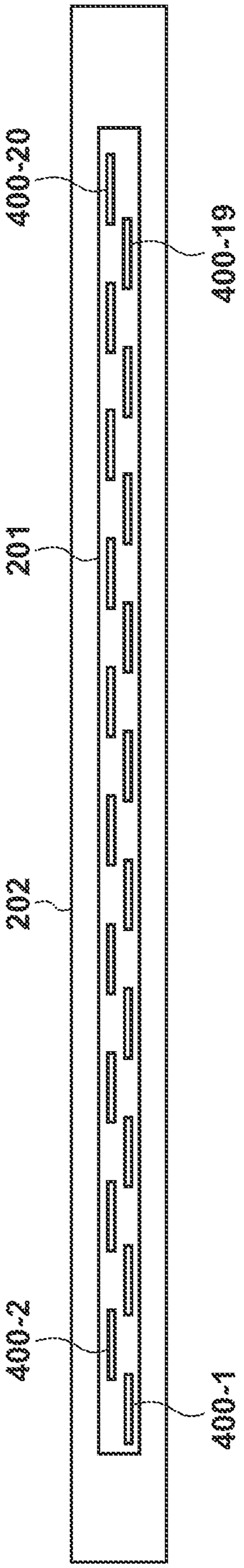
FIG. 3B is a second illustrative diagram showing a configuration of the printed circuit board of the exposure head according to an embodiment.
Figure 4:
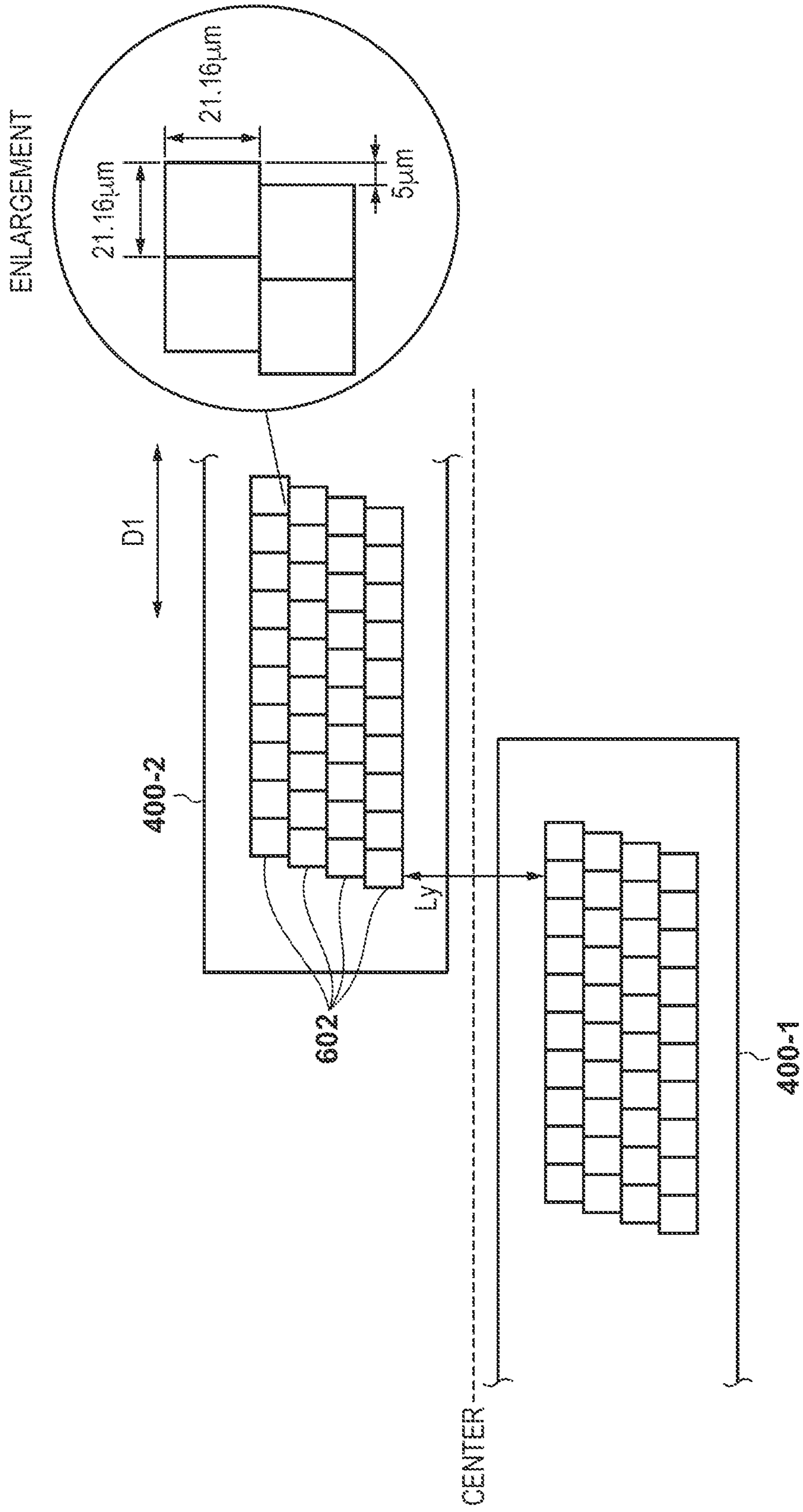
FIG. 4 is an illustrative diagram showing light-emitting chips and light-emitting element sets in the light-emitting chips according to an embodiment.

FIGS. 3A and 3B show an example of a configuration of the printed circuit board 202. Note that FIG. 3A shows a face on which a connector 305 is mounted, and FIG. 3B shows a side on which the light-emitting element set 201 is mounted (a face on the side opposite to the face on which the connector 305 is mounted). FIG. 4 schematically shows the light-emitting chips 400 and arrays of light-emitting elements 602 in the light-emitting chips 400. The light-emitting element set 201 in the present embodiment includes light-emitting elements included in twenty light-emitting chips 400-1 to 400-20. The light-emitting chips 400-1 to 400-20 are in a staggered arrangement along the axial direction D1. More specifically, ten light-emitting chips 400-*n* with n being odd numbers form one line, and another ten light-emitting chips 400-*n* with n being even numbers form another one line. The positions of these two lines in the circumferential direction D2 are different. In this specification, the light-emitting chips 400 in the former line are also referred to as odd-numbered light-emitting chips 400, and the light-emitting chips 400 in the latter line are also referred to as even-numbered light-emitting chips 400. The light-emitting chips 400-1 to 400-20 are also referred to collectively as light-emitting chips 400. Each light-emitting chip 400 on the printed circuit board 202 is connected to the image controller 800 (FIG. 8) via the connector 305. In the following, there are cases where the smaller branch number side of the light-emitting chips 400-1 to 400-20 arranged in the axial direction D1 is referred to as "left" and the larger branch number side as "right", for convenience of description. For example, the light-emitting chip 400-1 is a light-emitting chip 400 at the left end, and the light-emitting chip 400-20 is a light-emitting chip at the right end.

The light-emitting element array in each light-emitting chip 400 is a two-dimensional array consisting of N columns (N is an integer of 2 or more) in the axial direction D1 and M rows (M is an integer of 2 or more) in the circumferential direction D2. In an illustrative embodiment, N may be 748 and M may be 4; in this case, each light-emitting chip 400 has a total of 2992 (=748×4) light-emitting elements 602. In the entire light-emitting element set 201 that includes 20 light-emitting chips 400, 14960 light-emitting elements are arranged in the axial direction D1. The pitch of light-emitting elements 602 adjoining in the axial direction D1 may be approximately 21.16 μm in correspondence with a resolution of 1200 dpi. In this case, the length of the entire light-emitting element set 201 in the axial direction D1 is approximately 316 mm (maximum width of a formable image), and the length of each light-emitting chip 400 in the axial direction D1 is approximately 15.8 mm. The M light-emitting elements in the respective columns are shifted from each other in the axial direction D1 at a pitch of about 5 μm, which corresponds to a resolution of 4800 dpi, and arranged in a staircase pattern. FIG. 4 shows an example in which the lower light-emitting elements, of the two upper and lower light-emitting elements, are shifted to the left, but the lower light-emitting elements may alternatively be shifted to the right. Further, the light-emitting elements in the right-end column of an odd-numbered light-emitting chip 400 and the light-emitting elements in the left-end column of an even-numbered light-emitting chip 400 may overlap with each other in the axial direction D1, as shown in FIG. 4. Similarly, the light-emitting elements in the left-end column of an odd-numbered light-emitting chip 400 and the light-emitting elements in the right-end column of an even-numbered light-emitting chip 400 may also overlap with each other in the axial direction D1. The distance Ly between light-emitting element arrays in these light-emitting chips 400 may be, for example, about 105 km. By thus arranging the light-emitting element arrays to overlap with each other in the axial direction D1, it is possible to avoid a situation in which implementation variation results in voids within an exposable range. When such an overlapping arrangement is employed, ordinarily, the light-emitting elements in only one of the overlapping columns are used as effective light-emitting elements that may emit light in accordance with image data. The light-emitting elements in the other column need not be used regardless of image data. Note that the number of columns or light-emitting elements overlapping in the axial direction D1 is not limited to the above example (four pixels in one column), but may be any number.

Figure 5:
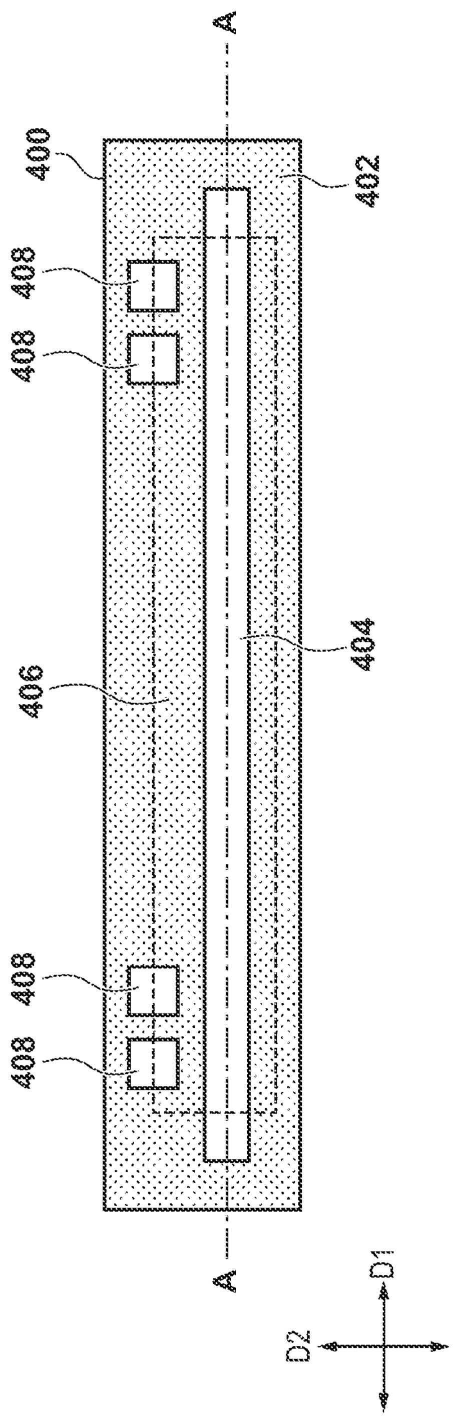
FIG. 5 is a plan view of a schematic configuration of the light-emitting chip according to an embodiment.

FIG. 5 is a plan view of a schematic configuration of the light-emitting chip 400. The plurality of light-emitting elements 602 of each light-emitting chip 400 are formed on a light-emitting substrate 402, which is a silicon substrate, for example. The light-emitting substrate 402 has a circuit section 406 for driving the plurality of light-emitting elements 602. A plurality of pads 408 are used to connect, to the circuit section 406, signal lines for communicating with the image controller 800, power lines for connection with power supplies, and ground lines for connection with ground. The signal lines, the power lines, and the ground lines may be gold wires, for example.

Figure 6:
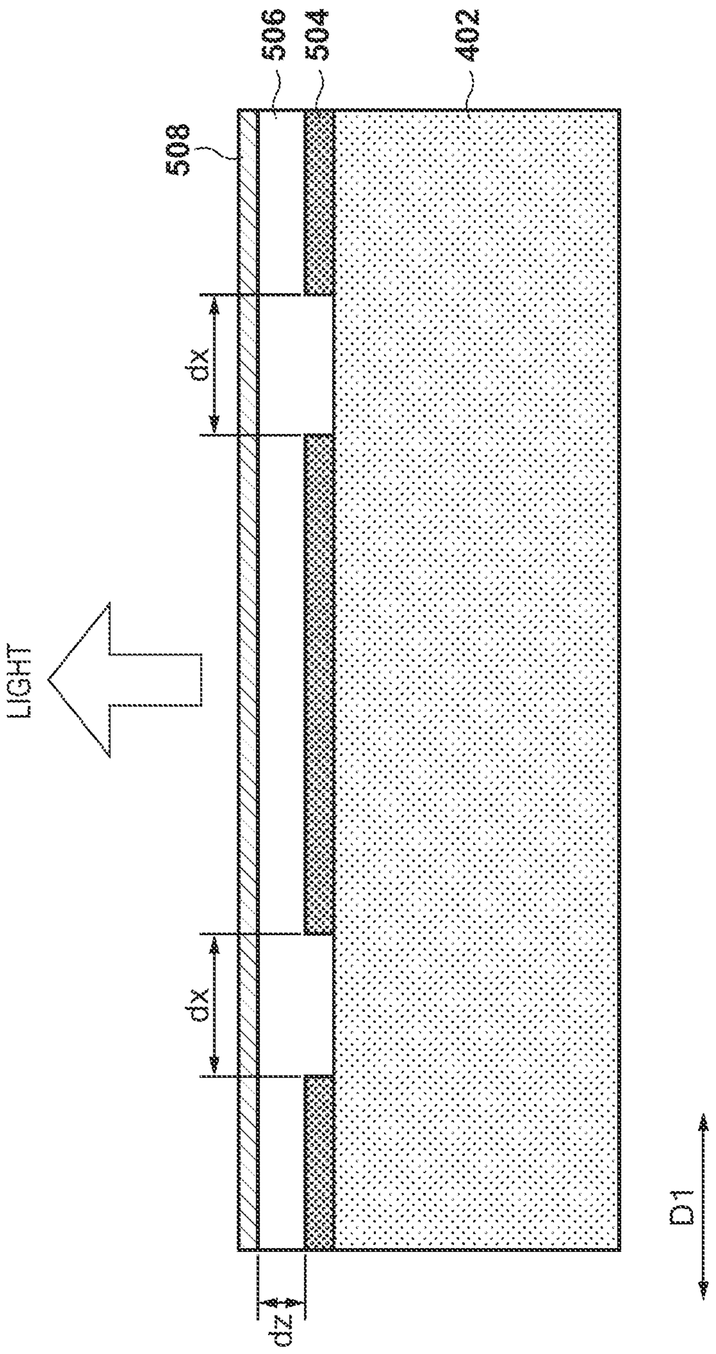
FIG. 6 is a cross-sectional view of a schematic configuration of the light-emitting chip according to an embodiment.

FIG. 6 shows a portion of a cross-section of FIG. 5 taken along a line A-A. A plurality of lower electrodes 504 are formed on the light-emitting substrate 402. A light-emitting layer 506 is provided on the lower electrodes 504, and an upper electrode 508 is provided on the light-emitting layer 506. The upper electrode 508 is one common electrode for the plurality of lower electrodes 504. When a voltage is applied between the lower electrodes 504 and the upper electrode 508, the light-emitting layer 506 emits light as a result of a current flowing from the lower electrodes 504 to the upper electrode 508. Thus, one lower electrode 504 and partial regions of the light-emitting layer 506 and the upper electrode 508 that correspond to the lower electrode 504 constitute one light-emitting element 602. "dx" in the figure indicates the distance between two adjoining lower electrodes 504. "dz" indicates the distance between the lower electrodes 504 and the upper electrode 508. Making dx larger than dz can suppress a leakage current between adjoining lower electrodes 504 and prevent a light-emitting element 602 that should not emit light from accidentally emitting light.

In the present embodiment, the light-emitting elements 602 are configured as organic electro-luminescence (EL) elements. For example, an organic EL film can be used as the light-emitting layer 506. In another embodiment, the light-emitting elements 602 may be configured as inorganic EL elements by using an inorganic EL film as the light-emitting layer 506. Generally, the light-emitting element 602 may be any type of light-emitting diodes (LEDs).

The upper electrode 508 is constituted by a transparent electrode made of indium tin oxide (ITO) or the like so as to allow the emission wavelength of the light-emitting layer 506 to be transmitted. In the example in FIG. 6, the entire upper electrode 508 allows the emission wavelength of the light-emitting layer 506 to be transmitted, but the entire upper electrode 508 need not necessarily allow the wavelength of the light-emitting layer 506 to be transmitted. Specifically, it is sufficient that a partial region through which light from each light-emitting element 602 passes allows the emission wavelength to be transmitted.

Although one continuous light-emitting layer 506 is formed in FIG. 6, a plurality of light-emitting layers 506 each having a width equal to the width of a corresponding lower electrode 504 may alternatively be formed on the respective lower electrodes 504. Further, in FIG. 6, the upper electrode 508 is formed as one common electrode for the plurality of lower electrodes 504; however, a plurality of upper electrodes 508 each having a width equal to the width of a corresponding lower electrode 504 may alternatively be formed in correspondence with the respective lower electrodes 504. Further, a first plurality of lower electrodes 504, out of the lower electrodes 504 of each light-emitting chip 400, may be covered by a first light-emitting layer 506, and a second plurality of lower electrodes 504 may be covered by a second light-emitting layer 506. Similarly, a first upper electrode 508 may be formed in common for a first plurality of lower electrodes 504, out of the lower electrodes 504 of each light-emitting chip 400, and a second upper electrode 508 may be formed in common for a second plurality of lower electrodes 504. With such a configuration as well, one lower electrode 504 and regions of the light-emitting layer 506 and the upper electrode 508 that correspond to the lower electrode 504 constitute one light-emitting element 602.

3. MULTIPLE EXPOSURE

While the use of organic EL elements as the light-emitting elements 602 facilitates downsizing and cost reduction of the apparatus, there are cases where the amount of light that can be emitted by a single organic EL element is insufficient to form an image with a desired density. The present embodiment adopts a multiple exposure technique to subject each pixel region (spot region) on the photosensitive member 102 to multiple exposure by causing the plurality of light-emitting elements 602 arranged in the circumferential direction of the photosensitive member 102 to successively emit light.

Figure 7:
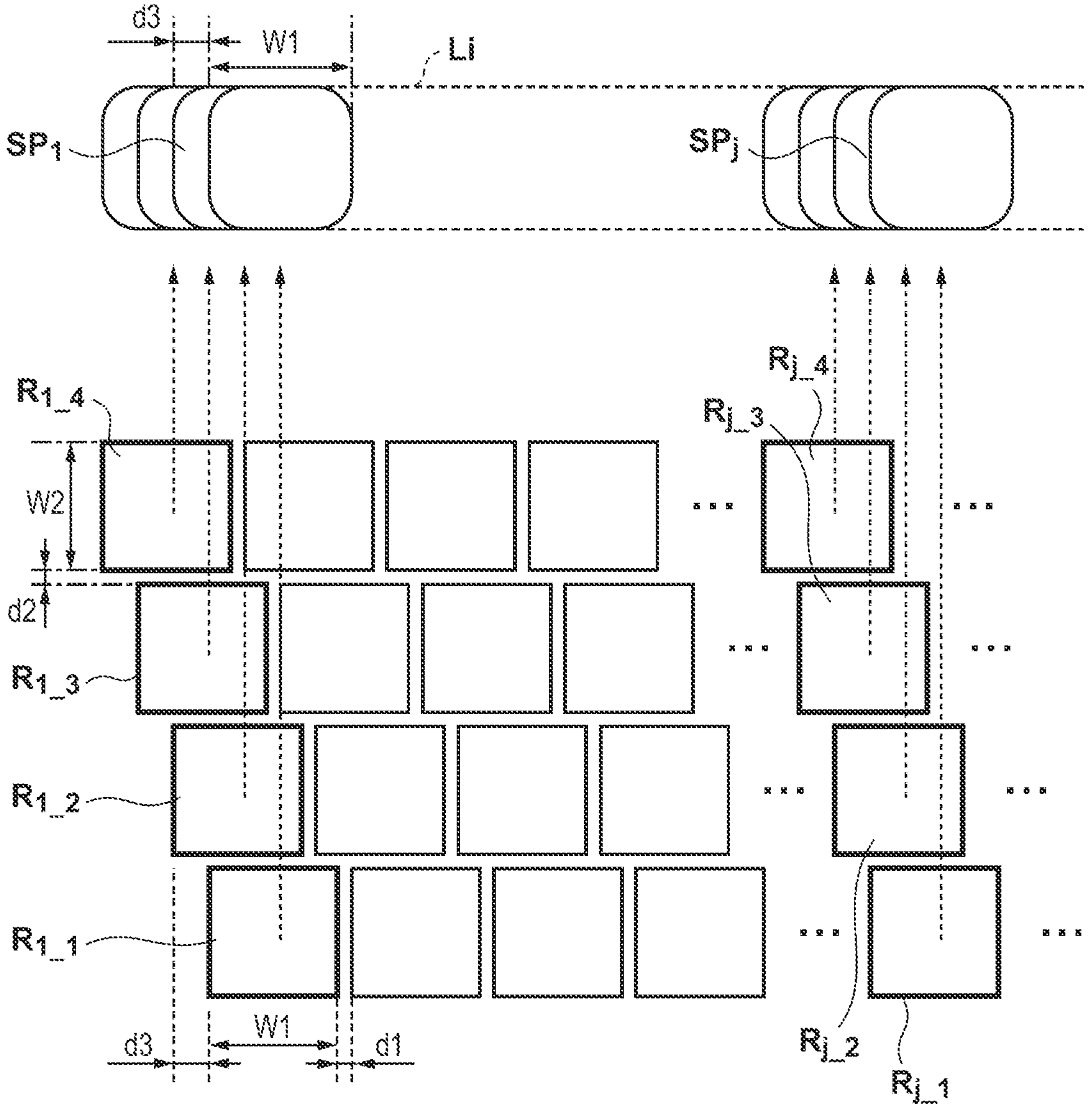
FIG. 7 is an illustrative diagram regarding multiple exposure performed with light-emitting elements arranged in a staircase pattern.

FIG. 7 is an illustrative diagram regarding multiple exposure performed with light-emitting elements arranged in a staircase pattern. In the present embodiment, M light-emitting elements 602 in each column of the light-emitting element array may be arranged in a staircase pattern at a fixed pitch, as mentioned above. Here, an example of an arrangement of light-emitting elements when M=4 is shown. $R_{j\_m}$ (={1, 2, . . . , N}, m={1, 2, 3, 4}) in the figure represents a light-emitting element 602 in a j-th column from the left in the axial direction and an m-th row from the bottom in the circumferential direction. W1 in the figure denotes the width of each light-emitting element 602 in the axial direction, and W2 denotes the width of each light-emitting element 602 in the circumferential direction. d1 denotes the distance between adjoining light-emitting elements 602 in the axial direction, and d2 denotes the distance between adjoining light-emitting elements 602 in the circumferential direction. d1 and d2 represent the aforementioned distance dx between electrodes that is divided into ones in two coordinate axes, and both are determined so as to be wider than the distance dz between the upper electrode and the lower electrode. The minimum pitch d3 of the light-emitting elements 602 in the axial direction may be about 5 m (equivalent to 4800 dpi), as mentioned above.

Due to four light-emitting elements in each column being arranged in a staircase pattern as in the example in FIG. 7, any two adjoining light-emitting elements among those four light-emitting elements occupy partially overlapping areas in the axial direction. The four light-emitting elements in a column corresponding to each pixel position on input image data successively emit light while the photosensitive member 102 rotates, thereby forming a spot corresponding to the pixel position on the surface of the photosensitive member 102. In the example in FIG. 7, when the pixel value at the left end of an i-th line of input image data indicates that light emission is on, light-emitting elements $R_{1\_1}$, $R_{1\_2}$, $R_{1\_3}$, and $R_{1\_4}$ successively emit light at the timing at which the respective light-emitting elements face a line $L_i$ on the surface of the photosensitive member 102. As a result, the spot region at the left end of the line $L_i$ is subjected to multiple exposure, and a corresponding spot $SP_1$ is formed. Similarly, when a j-th pixel value from the left end of the i-th line of the input image data indicates that light emission is on, light-emitting elements $R_{j\_1}$, $R_{j\_2}$, $R_{j\_3}$, and $R_{j\_4}$ successively emit light at the timing at which the respective light-emitting elements face the line $L_i$ on the surface of the photosensitive member 102. As a result, a j-th spot region from the left end of the line $L_i$ is subjected to multiple exposure, and a corresponding spot $SP_j$ is formed. When the pitch of the light-emitting elements in the circumferential direction is approximately 21.16 μm and the sheet transport speed is 200 mm/s, the period during which each line is exposed by one light-emitting element $R_{j\_m}$ (line period) may be approximately 105.8 μs. Thus, as a result of four light-emitting elements in each column of twenty light-emitting chips 400 successively emitting light at appropriate timings, a smooth line of an electrostatic latent image that is constituted by a series of spots with a constant spot distance that partially overlap with each other may be formed on the surface of photosensitive member 102. A two-dimensional electrostatic latent image is produced as a result of such lines being continuously formed in the circumferential direction.

In the following description, a spot region in which a spot of an electrostatic latent image is formed as a result of multiple exposure performed with light emitted by M light-emitting elements 602 is referred to as an "exposed dot", and a spot region in which no spot is formed due to no light-emitting element 602 emitting light is referred to as a "non-exposed dot".

4. CONFIGURATION OF CONTROL CIRCUIT

Figure 8:
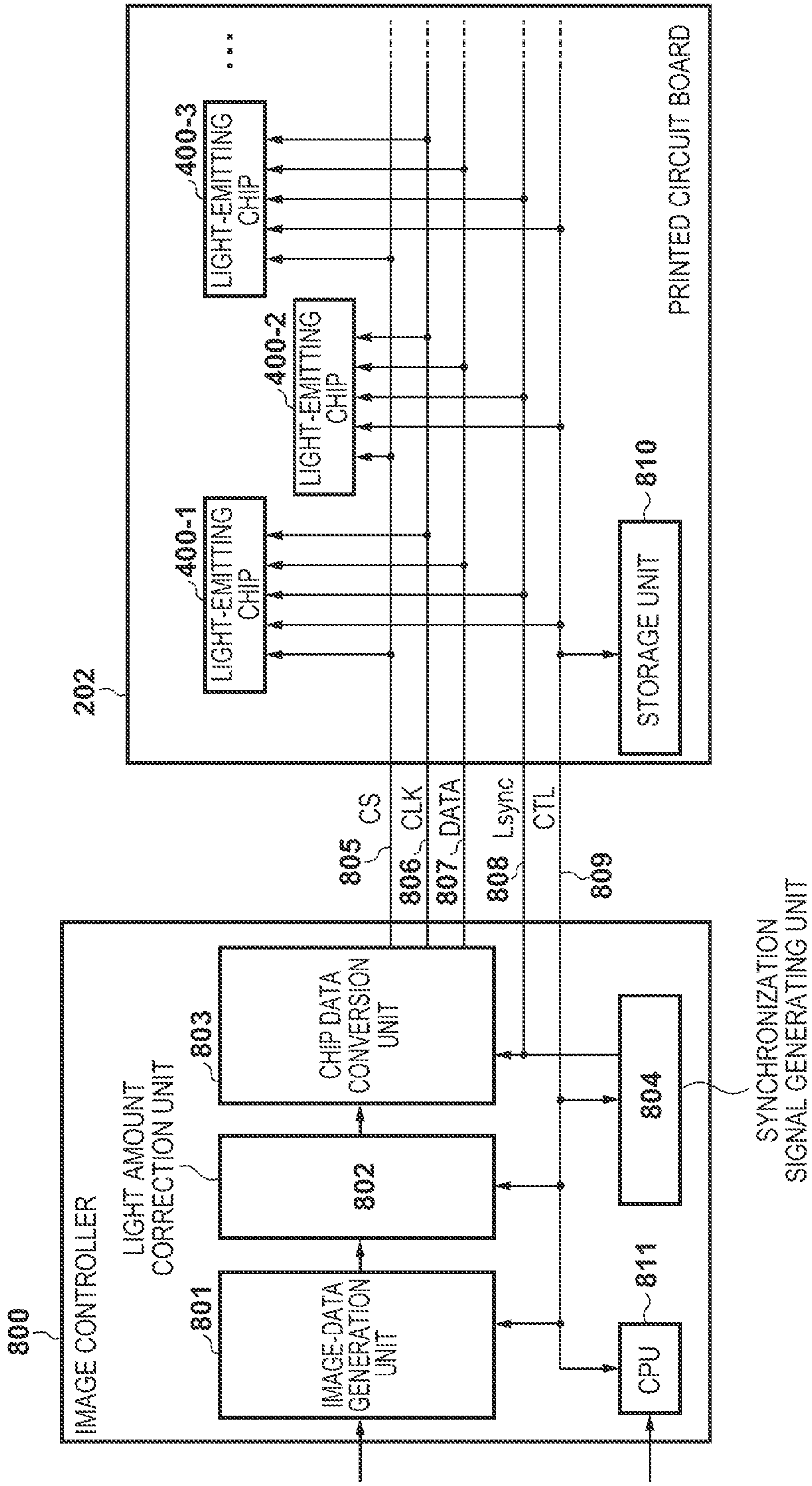
FIG. 8 is a configuration diagram of a control circuit for controlling light emission performed by the light-emitting chips on the printed circuit board.

FIG. 8 shows an example of a configuration of a control circuit for controlling light emission by the light-emitting chips 400 on the printed circuit board 202. Here, processing for a single color component will be described to simplify the description; however, in practice, the same processing is performed for four color components in parallel. The image controller 800 is connected to each light-emitting chip 400 on the printed circuit board 202 via a plurality of signal lines 805 to 809. A chip select signal line 805 carries a chip select signal CS, which indicates an effective range of image data. A clock signal line 806 carries a clock signal CLK. A data signal line 807 carries image data DATA. A synchronization signal line 808 carries a line synchronization signal Lsync for identifying a line period for the image data. A communication signal line 809 carries a control signal CTL.

An image data generation unit 801 performs image processing on image data received from the reading unit 100 or an external device, and generates image data in a binary bitmap format for performing control to turn on and off light emission by the light-emitting elements 602 of the light-emitting chips 400 on the printed circuit board 202. Image processing here may include, for example, raster transformation and halftoning (e.g., dithering). Image data after being subjected to halftoning is a set of bits indicating, for a position of each of pixels constituting an image to be formed, whether or not to cause corresponding M light-emitting elements 602 to emit light. If a bit for a certain pixel position indicates "emission", a corresponding spot region on the surface of the photosensitive member 102 will be an exposed dot. If this bit indicates "non-emission", the corresponding spot region will be a non-exposed dot. The image data generation unit 801 outputs the generated image data to the light amount correction unit 802.

The light amount correction unit 802 performs correction processing on the image data input from the image data generation unit 801 to correct an unevenness in light amount of the exposure head 106 based on correction data generated by the CPU 811. The light amount correction unit 802 then outputs the corrected image data to the chip data conversion unit 803. The correction of an unevenness in light amount performed by the light amount correction unit 802 will be described in more detail later.

The chip data conversion unit 803 reads pixel values within a corresponding read range in the image data input from the light amount correction unit 802 in each line period identified by the line synchronization signal Lsync, and sends the image data indicating the read pixel values over the data signal line 807. The image data DATA is, for example, a sequence of pixel values corresponding to the respective light-emitting elements 602 of twenty light-emitting chips 400. The chip data conversion unit 803 designates which light-emitting chip 400 is to receive each portion of the image data DATA, by means of the chip select signal CS. The chip data conversion unit 803 generates the clock signal CLK and supplies the generated signal to the light-emitting chips 400 in order to achieve synchronization of timings of transmitting and receiving individual signal values with the light-emitting chips 400.

The synchronization signal generating unit 804 determines delimitation of a line of the image data, generates the line synchronization signal Lsync, and supplies the generated line synchronization signal Lsync to the synchronization signal line 808.

A storage unit 810 on the printed circuit board 202 is a memory or a register that stores control data for controlling light emission performed by the light-emitting chips 400. As will be described later, the control data stored in the storage unit 810 may include, for example, setting values related to an amount of supplied current and later-described correction data.

The light-emitting chips 400 drive light-emitting elements 602 in each line period identified by the line synchronization signal Lsync in accordance with the image data after correction of light amounts input from the chip data conversion unit 803. For example, if the chip select signal CS indicates a data reception timing for a certain light-emitting chip 400, this light-emitting chip 400 receives a portion of the image data DATA that is directed thereto via the data signal line 807. Each light-emitting chip 400 then drives light-emitting elements 602 in a light-emitting element array of M rows and N columns in accordance with the pixel values included in the received image data.

The CPU 811 controls the entire image-forming apparatus 1. For example, the CPU 811 controls generation of the aforementioned image data, light amount correction, generation of the line synchronization signal, and transmission of the image data to the printed circuit board 202. In the present embodiment, the CPU 811 also executes calibration using a correction chart in response to an instruction given via a user interface. Specifically, the CPU 811 causes the image-forming units 101 to form an image of the correction chart on a sheet. After the sheet with the image of the correction chart formed thereon has been set on the reading unit 100, the CPU 811 causes the reading unit 100 to optically read the image of the correction chart on the sheet. The CPU 811 then generates correction data for correcting an unevenness in light amount of the exposure head 106 using the read image of the correction chart that is obtained as a result of the reading. Accordingly, in the present embodiment, the CPU 811 functions as a generating unit that generates the correction data. An example of the correction data that may be generated by the CPU 811 will be described in more detail later.

Figure 9:
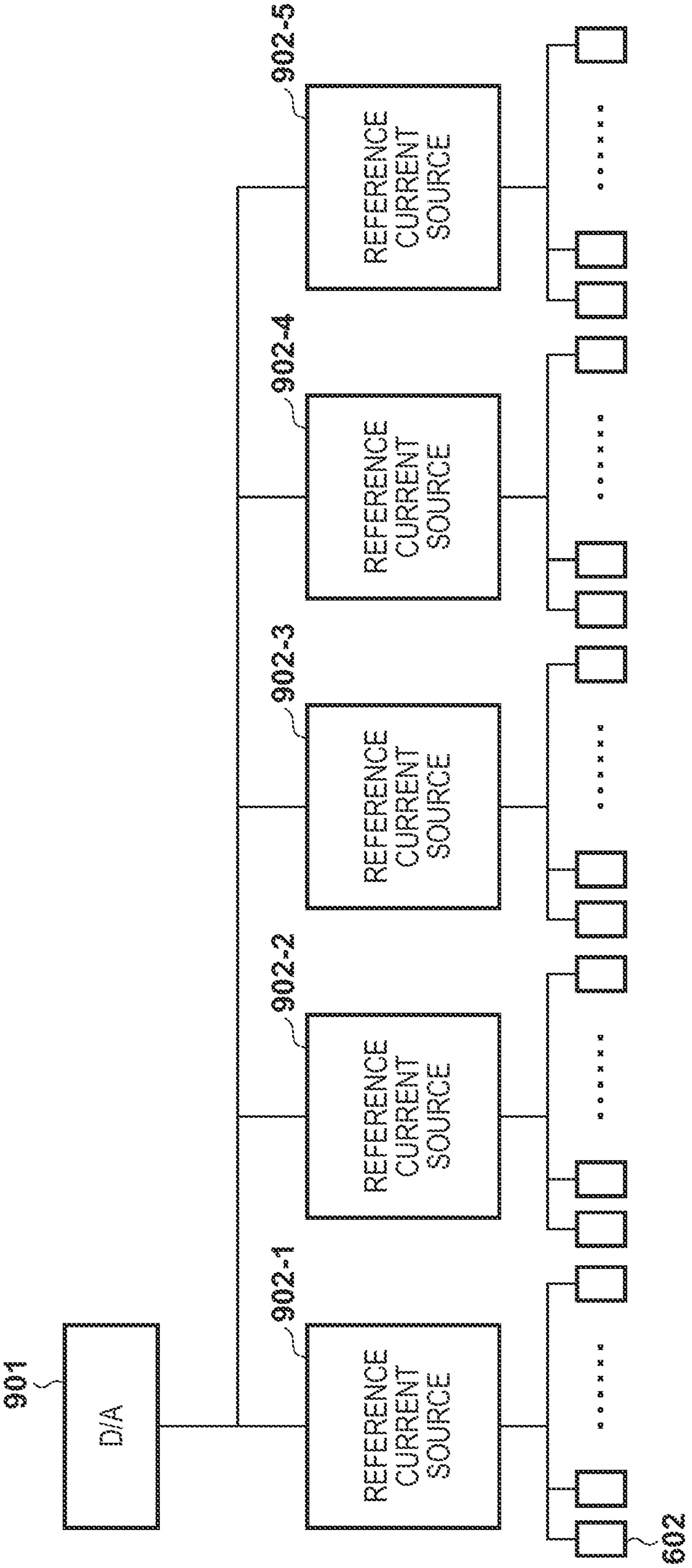
FIG. 9 is a block diagram showing a configuration of circuits related to a current supply in a light-emitting chip.

FIG. 9 is a block diagram showing a configuration of circuits related to the supply of a current in a light-emitting chip 400. Each light-emitting chip 400 includes a digital-to-analog converter (D/A) 901, a plurality of (five in the example in FIG. 9) reference current sources 902-1 to 902-5, and a plurality of light-emitting elements 602. Each light-emitting element 602 is supplied with current from one of the reference current sources 902-1 to 902-5, depending on the position of this light-emitting element 602 in the axial direction. Thus, the light-emitting elements 602 in each light-emitting chip 400 can be grouped into five groups.

The D/A 901 performs digital-to-analog conversion on a digital value indicating a setting value of the reference current, which is set by the CPU 811, and outputs an analog signal having a voltage corresponding to the setting value to the reference current sources 902. The setting value of the reference current is stored in advance in the aforementioned storage unit 810, read by the CPU 811, and output to the D/A 901. Each of the reference current sources 902-1 to 902-5 supplies a reference current corresponding to the voltage of the analog signal input from the D/A 901 to a corresponding group of the light-emitting elements 602. Note that the number of reference current sources 902 provided in each light-emitting chip 400 is not limited to the above example, and may be any number depending on wiring length in the chip or the driving capability of the reference current sources 902.

5. CORRECTION OF UNEVENNESS IN LIGHT AMOUNT

<5-1. Factors of Unevenness in Light Amount>

Examples of factors that cause an unevenness in light amount in the image-forming apparatus employing a solid-state exposure method may include the following items:

- Optical errors due to manufacturing variations of lenses of the rod-lens array;
- Errors in the amount of current supplied to the light-emitting elements due to individual differences of the current sources and circuits; and
- Errors in density due to fluctuations in spot size.

Optical errors due to manufacturing variations of lenses can occur at any position on a light-emitting chip 400 in the longitudinal direction (axial direction of the photosensitive member 102), and cause a local unevenness in light amount. Errors in the amount of supplied current due to individual differences of the current sources can occur per group of light-emitting elements 602 that are supplied with a current from the reference current sources 902. Note that errors in the amount of supplied current are not necessarily uniform even within one group since the current loss on a circuit can differ depending on the positions of the light-emitting elements 602. Fluctuations in spot size affect density characteristics relative to the gradation value of the image to be reproduced. Specifically, as the spot size enlarges on an imaging plane of light from the exposure head 106, the density of a printed image in a low gradation range becomes lower relative to an equivalent gradation value due to an insufficient light amount. Meanwhile, if the spot size enlarges, the density of a printed image in a high gradation range becomes higher relative to an equivalent gradation value due to clipping between adjoining spots. Fluctuations in spot size are primarily caused by variations during manufacturing of the exposure head 106. In the following description, an imaging spot with an enlarged size is referred to as an abnormal spot. An abnormal spot causes a local unevenness in density in the longitudinal direction of the exposure head 106. Note that the terms "unevenness in light amount" and "unevenness in density" may be used interchangeably herein, since the density of each spot in a formed image correlates with the light amount during exposure by corresponding light-emitting elements.

<5-2. Basic Correction Method>

Possible methods for correcting an unevenness in light amount include adjusting the amount of current supplied from the reference current sources 902 to the light-emitting chips 400, and correcting input image data so as to vary the local areal gradation. The present embodiment adopts both methods. The two correction methods may be combined in various manners; for example, it is conceivable to correct a coarse unevenness in light amount between the light-emitting chips 400 using the former method, and correct a fine unevenness in light amount within each light-emitting chip 400 using the latter method.

The former method may be performed by rewriting the setting value regarding the amount of supplied current within the control data stored in the storage unit 810. For example, the unevenness in light amount between the light-emitting chips 400 may be measured in an inspection phase after assembly of a product, without using a later-described correction chart 200. For example, the light amount from each light-emitting element 602 is measured in a state where all light-emitting elements 602 emit light, and a light-emitting element 602 with the lowest measured value is selected per light-emitting chip 400. Then, a setting value (later-described adjustment target value T) related to the amount of current supplied to each light-emitting chip 400 is determined such that the amount of light from each selected light-emitting element 602 becomes a target light amount that is constant over the light-emitting chips 400. The determined setting value is written into the storage unit 810 of each light-emitting chip 400. During subsequent image formation in the image-forming apparatus 1, differences in the light amount between the light-emitting chips 400 are generally eliminated, and the unevenness in light amount within each light-emitting chip 400 can be corrected using the latter method.

Figure 10A:
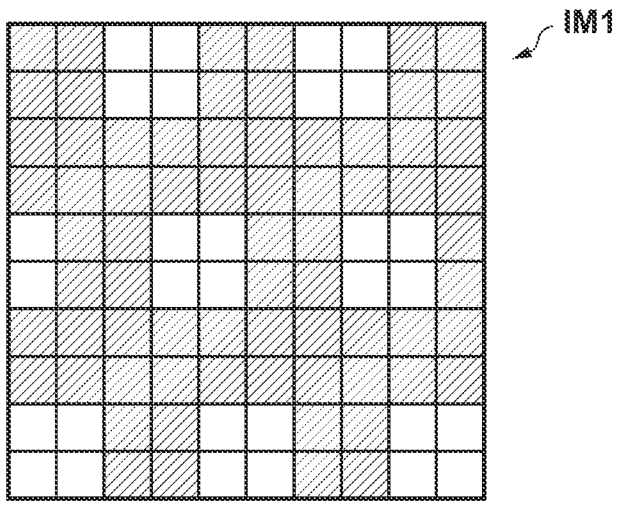
FIGS. 10A to 10C are illustrative diagrams regarding a method for correcting an unevenness in light amount by changing local areal gradations.

The latter method, which allows for fine correction of an unevenness in light amount, will be described below with reference to FIGS. 10A to 10C. FIG. 10A shows, as an example, a small image IM1 around a certain reference pixel position represented by pre-correction image data. One square in the figure corresponds to one pixel. A shaded pixel represents that a corresponding spot region is an exposed dot, i.e., corresponding M light-emitting elements emit light. A white pixel indicates that a corresponding spot region is a non-exposed dot, i.e., corresponding M light-emitting elements do not emit light. Here, an x-th pixel position from the left and a y-th pixel position from the top is denoted as (x, y), with respect to the upper left pixel of the small image.

Figure 10B:
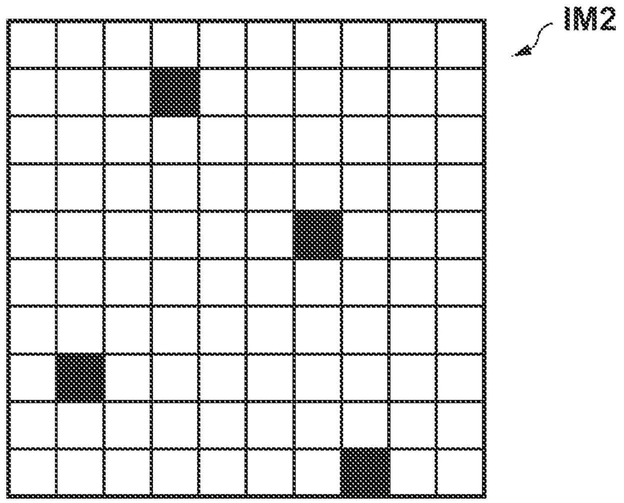
Figure 10C:
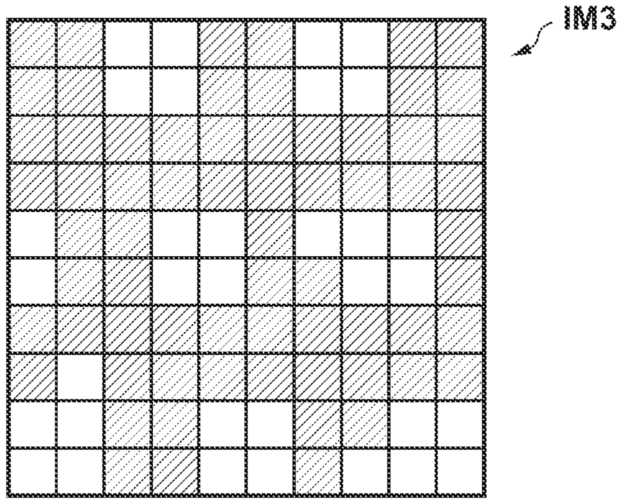

FIG. 10B shows a correction matrix IM2 as an example. The correction matrix IM2 is a matrix (bitmap) of the same size as the small image IM1, where one square in the figure corresponds to one element. Shaded elements represent pixels to be changed that are selected based on a calibration result. There can be two types of correction matrices, one for reducing the light amount and the other for increasing the light amount, and the correction matrix IM2 is a matrix for reducing the light amount. As an example, if the light amount at a reference pixel position is to be reduced by 4% relative to the maximum value, four pixels out of a total of 100 (=10×10) pixels are selected as the pixels to be changed. In the example in FIG. 10B, pixels at pixel positions (4, 2), (7, 5), (2, 8) and (8, 10) are selected as the pixels to be changed. The pixel position of a pixel to be changed may be selected in accordance with a known blue noise masking method, for example.

If a pixel at the same position as a pixel to be changed that is selected in the correction matrix IM2 indicates an exposed dot in the small image IM1, the light amount correction unit 802 changes this pixel to a non-exposed dot (i.e., inverts the pixel value). FIG. 10C shows an example of the results of correcting the small image IM1 using the correction matrix IM2. In a small image IM3 shown in FIG. 10C, the pixels at the pixel positions (7, 5), (2, 8) and (8, 10), which are exposed dots in the small image IM1, are changed to non-exposed dots. In the case of increasing the light amount at the reference pixel position, if a pixel at the same position as a selected pixel to be changed indicates a non-exposed dot in the small image IM1, the light amount correction unit 802 changes this pixel to an exposed dot. The light amount correction unit 802 repeats correction of a small image around each reference pixel position based on the correction data generated as a result of calibration, while scanning the reference pixel position in the axial direction within the input image data. As a result, fine correction of an unevenness in light amount in the axial direction can be realized.

Here, assuming that the light amount is to be increased or decreased by a large proportion, it would be necessary to select a large number of pixels to be changed and to change the pixel values thereof. However, such changes would have a risk of disrupting dot shapes in an image to be reproduced and degrading image quality. In the present embodiment, a coarse unevenness in light amount between the light-emitting chips 400 is corrected by adjusting the amount of supplied current, and only the remaining unevenness in light amount is corrected by changing the areal gradation, as mentioned above. Thus, the proportion by which the light amount is to be increased or decreased using the latter method is kept relatively small. Accordingly, it is possible to prevent degradation of image quality due to a collapse of dot shapes.

Although an example in which the size of the small image is 10×10 pixels has been described here, the present embodiment is not limited to this example. For example, when a pixel to be changed is selected in accordance with the blue noise mask method, setting the size of the small image to a larger size, namely 128×128 pixels or 256×256 pixels can spread the spatial frequency more randomly and significantly suppress interference moiré.

<5-3. Configuration Example of Correction Chart>

To effectively correct an unevenness in light amount as mentioned above, it is important to capture with high accuracy a local position at which the unevenness is occurring and to precisely determine at which position in the axial direction and to what degree the light amount is to be increased or decreased. In the present embodiment, the image-forming apparatus 1 uses a correction chart 200 such as that shown in FIG. 11.

Figure 11:
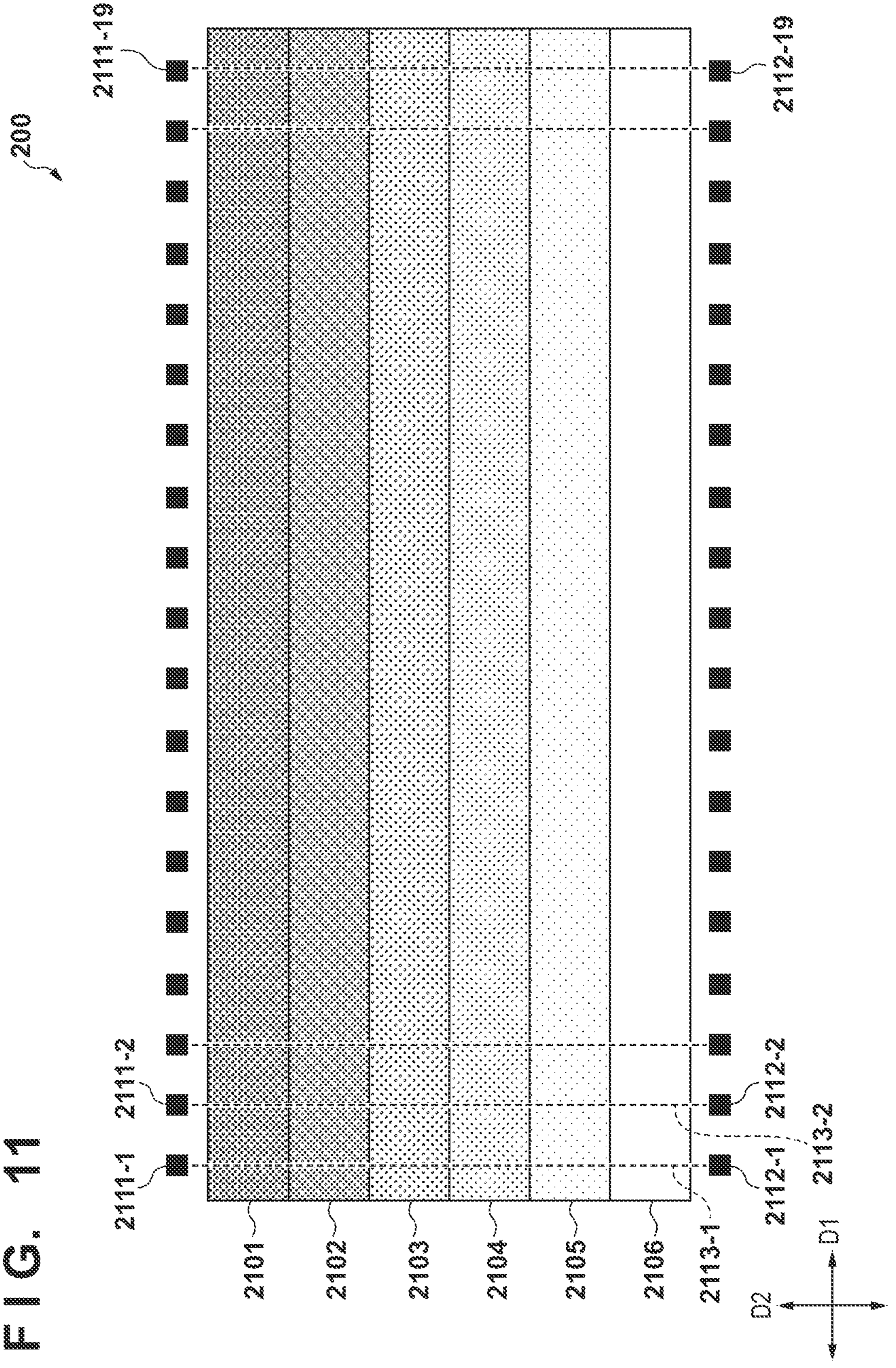
FIG. 11 is an illustrative diagram showing a configuration of a correction chart according to an embodiment.

Referring to FIG. 11, the correction chart 200 includes a plurality of band-shaped regions 2101 to 2106, each of which is a rectangular region having a longitudinal direction that is the axial direction D1. The band-shaped regions 2101 to 2106 are arranged in the circumferential direction D2 perpendicular to the axial direction D1. The band-shaped regions 2101 to 2106 are image regions with different gradations. The gradations of the band-shaped regions 2101 and 2102 belong to a high gradation range. The gradations of the band-shaped regions 2103 and 2104 belong to a medium gradation range. The gradations of the band-shaped regions 2105 and 2106 belong to a low gradation range. As will be described in more detail later, the band-shaped regions 2103 and 2104 may be primarily used to measure an error in light amount per light-emitting element or per light-emitting element group within each light-emitting chip 400. The band-shaped regions 2101, 2102, 2105 and 2106 may be primarily used to measure fluctuations in spot size in the imaging plane of light from the exposure head 106.

The correction chart 200 includes at least one first reference mark, namely first reference marks 2111-1 to 2111-19 located on one side (upper side in the figure) of the band-shaped regions 2101 to 2106 in the circumferential direction D2. In addition, the correction chart 200 includes at least one second reference mark, namely second reference marks 2112-1 to 2112-19 located on the other side (lower side in the figure) of the band-shaped regions 2101 to 2106 in the circumferential direction D2. The first reference marks 2111-1 to 2111-19 represent the boundaries of adjoining light-emitting chips among the plurality of light-emitting chips 400. The second reference marks 2112-1 to 2112-19 also represent those boundaries. When the correction data is generated based on the read image of the correction chart 200, the CPU 811 determines a representative position of a first reference mark 2111-*p* and a representative position of a corresponding second reference mark 2112-*p* (p=1, 2, . . . , 19) in the read image. The representative position here may be, for example, a centroid, one of the vertices, or the position of an end point in the axial direction D1 of each reference mark, depending on the mark shape. The CPU 811 then determines partial regions respectively formed by the light-emitting chips 400-1 to 400-20 within each of the band-shaped regions 2101 to 2106, using line segments connecting the determined representative positions (shown as dashed lines in the figure) as boundary lines. The CPU 811 measures the density in each of the thus-determined partial regions, and generates later-described correction data based on the measurement results.

The first reference marks 2111-1 to 2111-19 and the second reference marks 2112-1 to 2112-19 may be formed by effective light-emitting elements at least at one end of each light-emitting chip 400 in the axial direction D1 emitting light. For example, the first reference mark 2111-1 and the second reference mark 2112-1 may be formed as a result of four effective light-emitting elements 602 at the right end of the light-emitting chip 400-1 emitting light. The first reference mark 2111-2 and the second reference mark 2112-2 may be formed as a result of four effective light-emitting elements 602 at the right end of the light-emitting chip 400-2 emitting light. When specific light-emitting elements 602 adjoining a boundary between chips are driven to form a pair of the first reference mark 2111-*p* and the second reference mark 2112-*p*, a line segment connecting the representative positions of these reference marks substantially coincides with the boundary. For example, six partial regions between dashed lines 2113-1 and 2113-2 in the figure are image regions formed by the light-emitting chip 400-2.

For example, the CPU 811 causes the image-forming unit 101 to form an image of the correction chart 200 on a sheet in response to an instruction to execute calibration given via a user interface. A user or an engineer sets, on the reading unit 100, the sheet with the image of the correction chart 200 formed thereon and gives an instruction to read the image. The reading unit 100 optically reads the image of the correction chart 200 and outputs the read image to the CPU 811. The read image serves as input to generation of the correction data for correcting the unevenness in light amount. There is a possibility that, during this reading operation, a tilted read image is obtained due to skewing of the sheet. In the present embodiment, the correction chart 200 has six band-shaped regions 2101 to 2106. Thus, the effect of skewing of the sheet is more significant than in the case where only a single or a few band-shaped regions are present. If the correction chart 200 has only either the first reference marks 2111 or the second reference marks 2112, it is difficult to precisely determine in a tilted read image the boundaries between the light-emitting chips. However, in the present embodiment, the correction chart 200 has both the first reference marks 2111 and the second reference marks 2112. This enables the CPU 811 to precisely determine the boundaries between the light-emitting chips based on the positions of those reference marks and appropriately extract the respective partial regions from the read image.

Note that if the reading resolution of the reading unit 100 is different from the resolution of the image formed by the exposure head 106, the CPU 811 translates pixel positions in accordance with the ratio between these resolutions to extract the partial regions from the read image of the correction chart 200. For example, if the reading resolution is one-fourth of the resolution of the image formed by the exposure head 106, the resolution difference can be compensated for by multiplying an index of each pixel position in the read image by four (or by performing upsampling by a factor of four).

<5-4. Derivation of Light Amount Distribution>

Figure 12:
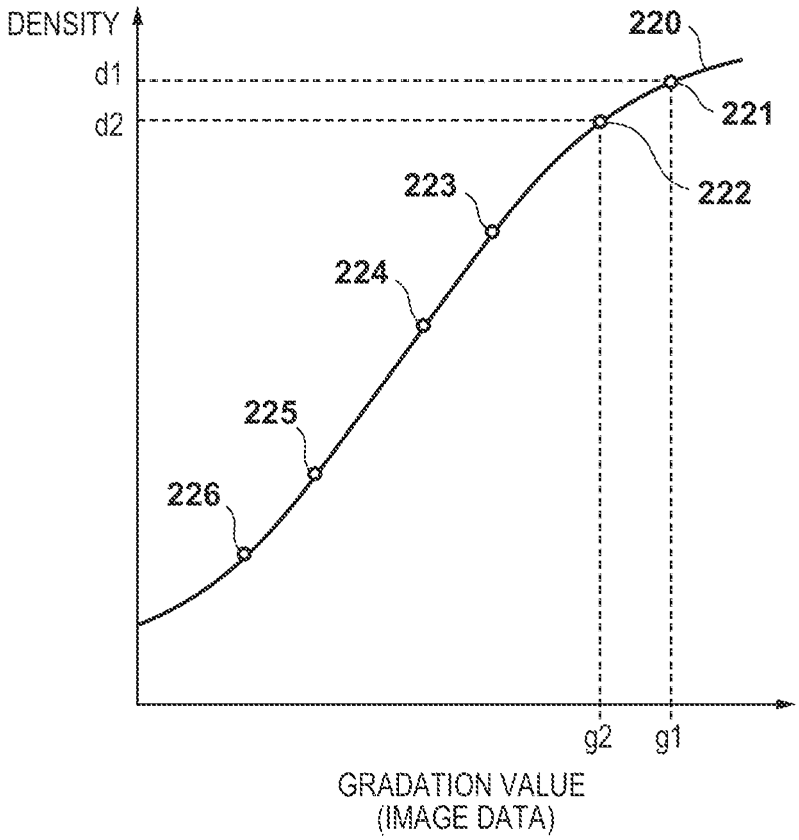
FIG. 12 is an illustrative diagram showing an example of a gradation-density characteristic curve that is measured using the correction chart shown in FIG. 11.

The CPU 811 extracts the partial regions formed by the light-emitting chips 400 from the read image of the correction chart 200 based on the positions of the reference marks, and measures the density of the image in each extracted partial region. FIG. 12 shows average density values measured for the partial regions in the band-shaped regions 2101 to 2106 formed by one light-emitting chip 400 that are plotted on a plane with the gradation value on the horizontal axis and the density on the vertical axis. For example, a point 221 represents a measured average density value for a gradation value g1 in the band-shaped region 2101, a point 222 represents a measured average density value for a gradation value g2 in the band-shaped region 2102, and the same applies to points 223 to 226. Note that a density value may be derived by substituting a three-dimensional signal value of the read image into a predetermined conversion formula, but a luminance value output from an image sensor may alternatively be used in place of the density value. A curved line 220 in FIG. 12 represents gradation-density characteristics of the light-emitting chip 400 that are estimated from the six average density values, and the slope of the density may differ depending on the gradation value. For example, if the average density values at the points 221 and 222 are denoted as d1 and d2, respectively, a conversion factor k for converting the density difference in the high gradation range to a difference in the gradation value (i.e., light amount difference) can be calculated in accordance with the following equation:

$$k=(d1-d2)/(g1-g2)$$

Similarly, a conversion factor for converting the density difference in the medium gradation range to a difference in the gradation value can be calculated by dividing the difference in the gradation value between the points 223 and 224 by the density difference. A conversion factor for converting the density difference in the low gradation range to a difference of the gradation value can be calculated by dividing the difference in the gradation value between the points 225 and 226 by the density difference.

Further, a light amount distribution in the axial direction in the light-emitting chip 400 can be derived for the high gradation range by multiplying the density at each pixel position measured along the axial direction for the partial regions of the band-shaped region 2101 by the conversion factor k calculated in accordance with the aforementioned equation. In the present embodiment, the CPU 811 derives the light amount distributions for the high gradation range, the medium gradation range, and the low gradation range. The CPU 811 then generates a light amount correction value A and a light amount correction value B, which will be described later, using the light amount distribution in the medium gradation range. The CPU 811 also generates a later-described light amount correction value C using the light amount distributions in the high gradation range and the low gradation range.

Note that the differences in gradation of the image between the band-shaped regions formed on the sheet may be realized by varying the amount of current supplied to the light-emitting elements 602, instead of making the gradation value of the image data of the correction chart different, between the pairs of the band-shaped regions used to calculate the aforementioned conversion factor.

<5-5. Generation of Correction Data>

(1) Fine Correction of Unevenness in Light Amount (Light Amount Correction Value A and Light Amount Correction Value B)

Figure 13:
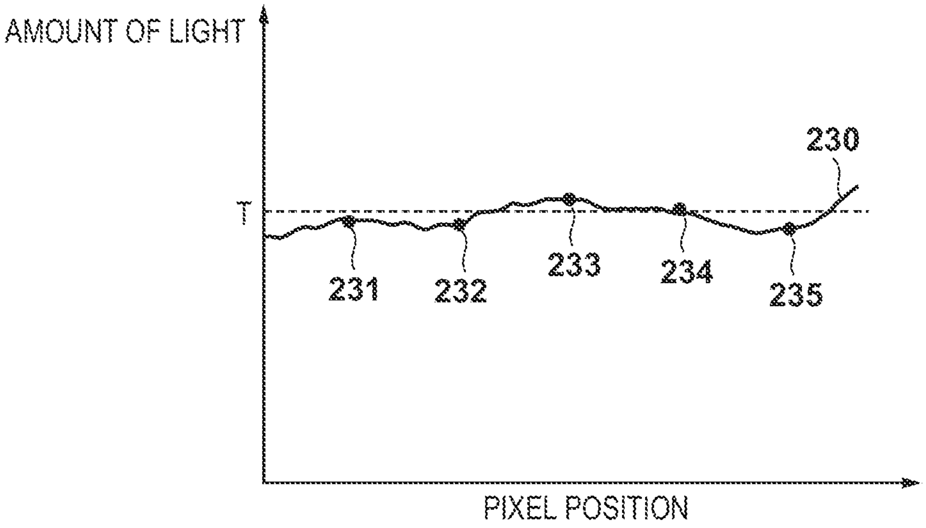
FIG. 13 is an illustrative diagram showing an example of a light amount distribution along an axial direction of one light-emitting chip.

FIG. 13 shows an example of the light amount distribution in the medium gradation range that may be derived in accordance with the method described in the previous section. The horizontal axis in FIG. 13 indicates the position (pixel position) of the light-emitting elements in the axial direction based on the left-end light-emitting element as a reference, for example, in one light-emitting chip 400. The vertical axis indicates the light amount. A light amount distribution graph 230 is a graph that traces the light amount (e.g., the product of the measured density and the conversion factor) calculated for each position. A light amount T indicated by a dashed line in the figure is a target light amount value for this light-emitting chip 400. For each pixel position, the ratio of the difference between the light amount value indicated by the light amount distribution graph 230 and the target light amount value T will represent a correction value for correcting an unevenness in light amount.

FIG. 13 shows five points 231 to 235 on the light amount distribution graph 230. These five points correspond to representative positions of five respective reference current sources 902-1 to 902-5 of one light-emitting chip 400. For example, the point 231 corresponds to the central position of a group of the light-emitting elements 602 that are supplied with a current from the reference current source 902-1, and the point 232 corresponds to the central position of a group of the light-emitting elements 602 that are supplied with a current from the reference current source 902-2. The CPU 811 generates correction data separately as a correction value (light amount correction value A) for each group and a correction value (light amount correction value B) for a remaining component for each element in the group. Generally, the variation in the light amount between the light-emitting elements 602 that are supplied with a current from the same reference current source 902 is small, and thus, the data size of the entire correction data can be kept small by thus generating the correction values separately. For example, if the resolution of correction is 1%, the average correction value for a certain group is 15%, and the largest remaining component of the correction value is 3%, the correction value for each group can be given in 4 bits, and then, the correction value for each element can be given in 2 bits per element.

Note that the CPU 811 may also update the target light amount value T so as to minimize the light amount correction values A and B based on the light amount distribution graph 230 derived using the read image of the correction chart 200. For example, the CPU 811 can update the target light amount value T by additionally writing in the storage unit 810 an offset value to be applied to the setting value of the amount of supplied current that is determined during a product inspection phase.

(2) Elimination of Effects of Abnormal Spot (Spot Correction Value C)

Figure 14:
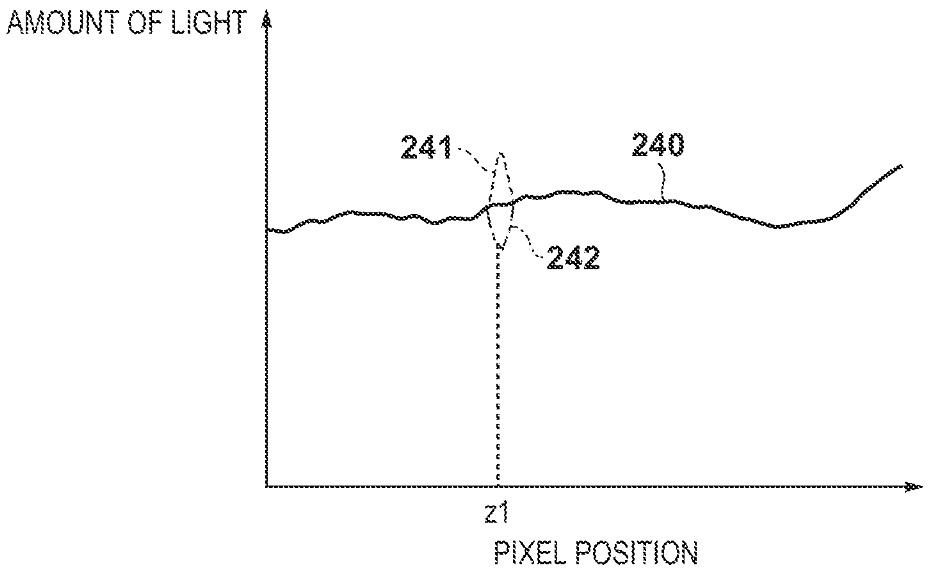
FIG. 14 is an illustrative diagram regarding the effect of an abnormal spot on the light amount distribution.

FIG. 14 is an illustrative diagram for schematically illustrating the effect of an abnormal spot resulting from variations occurring when manufacturing the exposure head 106 on the light amount distribution. A light amount distribution graph 240 indicated by a solid line in FIG. 14 represents an example of a light amount distribution in the medium gradation range, a light amount distribution graph 241 indicated by a dashed line represents an example of a light amount distribution in the high gradation range, and a light amount distribution graph 242 indicated by a single-dotted line represents an example of a light amount distribution in the low gradation range. Here, it is assumed that an abnormal spot is present at a pixel position z1. The light amount distribution graphs 240, 241 and 242 can be derived from the results of measuring the density in partial regions of the band-shaped regions 2101, 2103 and 2105, respectively. As a spot enlarges, clipping at the spot (exposed dot) between adjacent spots causes an increase in the density in the high gradation range, which appears as a local increase in the density in the light amount distribution graph 241. Conversely, in the low gradation range, an insufficient light amount at an enlarged spot causes a decrease in the density, which appears as a local decrease in the density in the light amount distribution graph 242.

Figure 15:
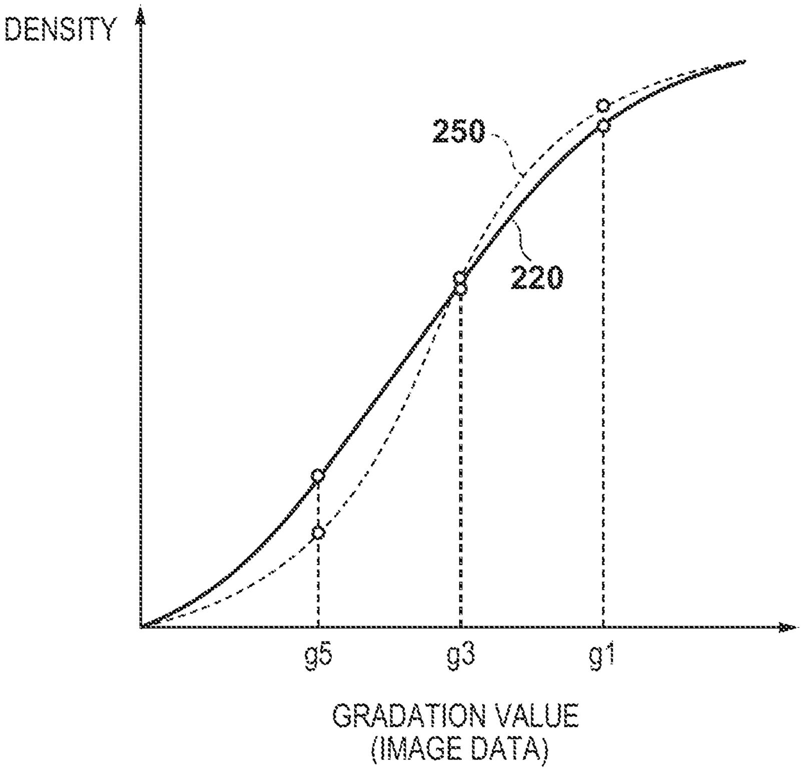
FIG. 15 is an illustrative diagram contrastively showing gradation-density characteristic curves at a normal spot and an abnormal spot.

FIG. 15 shows a gradation-density characteristic curve 220 at a normal spot (same as that shown in FIG. 12) indicated by a solid line, and a gradation-density characteristic curve 250 at an abnormal spot indicated by a dashed line. With the density corresponding to the gradation value g1 that belongs to the high gradation range, the characteristic curve 250 is higher than the characteristic curve 220, while with the density corresponding to the gradation value g5 that belongs to the low gradation range, the characteristic curve 250 is lower than the characteristic curve 220. With the density corresponding to the gradation value g3 that belongs to the medium gradation range, the difference between the characteristic curve 220 and the characteristic curve 250 is substantially zero. Within the gradation value range, a gradation value with which the density difference between the characteristic curve 250 and the characteristic curve 220 is largest in the positive direction can be determined through experiment. The gradation value of the band-shaped region 2101 of the correction chart 200 may be thus determined. A gradation value with which the density difference between the characteristic curve 250 and the characteristic curve 220 is zero can also be determined through experiment. The gradation value of the band-shaped region 2103 of the correction chart 200 may be thus determined. A gradation value with which the density difference between the characteristic curve 250 and the characteristic curve 220 is largest in the negative direction can also be determined through experiment. The gradation value of the band-shaped region 2105 of the correction chart 200 may be thus determined. The gradation values of the band-shaped region 2102, the band-shaped region 2104 and the band-shaped region 2106 may be determined by subtracting a fixed offset from the gradation values of the band-shaped region 2101, the band-shaped region 2103 and the band-shaped region 2105, respectively.

The density in partial regions of the band-shaped regions 2103 and 2104 with gradation in the medium gradation range is substantially unaffected by the presence or absence of the abnormal spot. Therefore, the CPU 811 measures an error in light amount per light-emitting element or per light-emitting element group and generates the light amount correction values A and B using the light amount distribution obtained from the results of measuring the density in partial regions of the band-shaped regions 2103 and 2104, as mentioned above. Meanwhile, the light amount distribution in the high gradation range obtained from the results of measuring the density in partial regions of the band-shaped regions 2101 and 2102 and the light amount distribution in the low gradation range obtained from the results of measuring the density in partial regions of the band-shaped regions 2105 and 2106 may be used to detect an abnormal spot. For example, the CPU 811 detects an abnormal spot by examining the maximum value in the light amount distribution in the high gradation range and the minimum value in the light amount distribution in the low gradation range. The CPU 811 then generates, as a spot correction value C, position(s) of the detected abnormal spot(s) and the amount of fluctuation in spot size at each position (a difference from a predetermined reference value; also referred to as a spot shift amount).

(3) Storing and Updating of Correction Data

Initial values of the correction data that includes the above-described light amount correction value A, light amount correction value B, and spot correction value C may be generated in a pre-shipment inspection phase of the product and stored in the storage unit 810 of each light-emitting chip 400. The CPU 811 updates the data stored in the storage unit 810 of each light-emitting chip 400 with the correction data that is generated as a result of calibration executed after the shipment of the product.

Note that the generation of the correction data in the inspection phase need not necessarily be performed using the correction chart 200. For example, the size of an imaging spot of each light-emitting element 602 may be measured by causing the light-emitting elements 602 to discretely emit light, one by one, and receiving the light with a charged coupled device (CCD) camera placed on the imaging plane.

<5-6. Details of Light Amount Correction Unit>

Figure 16:
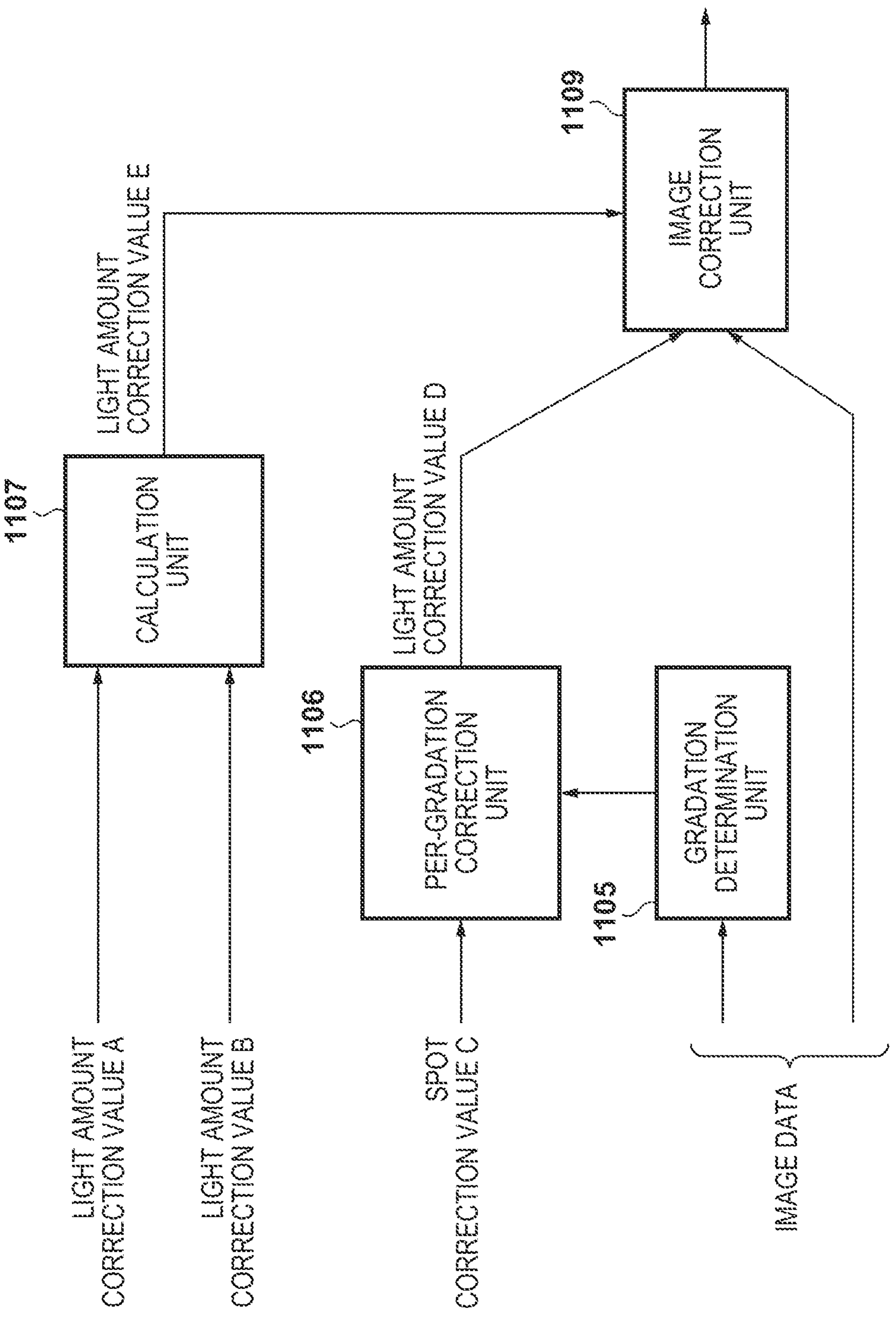
FIG. 16 is a block diagram showing a detailed configuration of a light amount correction unit according to an embodiment.

This section will describe a detailed configuration example of the light amount correction unit 802 that corrects image data using the above-described correction data (light amount correction value A, light amount correction value B, and spot correction value C). When the image-forming apparatus 1 executes a job for image formation, the CPU 811 reads the correction data from the storage unit 810 and supplies the read correction data to the light amount correction unit 802. Image data in bitmap format generated by the image data generation unit 801 is input together with the correction data to the light amount correction unit 802. FIG. 16 shows an example of a detailed configuration of the light amount correction unit 802. Referring to FIG. 16, the light amount correction unit 802 includes a gradation determination unit 1105, a per-gradation correction unit 1106, a calculation unit 1107, and an image correction unit 1109.

The light amount correction value A is a correction value for correcting an unevenness in light amount per group of light-emitting elements 602 in each light-emitting chip 400. The light amount correction value A enables correction of an unevenness in light amount caused by errors in the amount of current supplied to the light-emitting elements due to individual differences between the reference current sources 902. The light amount correction value B is a correction value for correcting the remaining component of the unevenness in light amount per light-emitting element in the group. The spot correction value C is a correction value for correcting an unevenness in light amount caused by an abnormal spot. The spot correction value C may indicate position (s) of detected abnormal spot(s) and a spot shift amount at each position. As mentioned above, the effect of the abnormal spot differs depending on the gradation value. In the present embodiment, it is determined whether to decrease or increase the light amount, depending on the gradation value in the image data. The absolute value of the increase/decrease amount is determined based on the spot shift amount.

The gradation determination unit 1105 determines a gradation range at each pixel position based on the input image data. For example, the gradation determination unit 1105 focuses on a patch image that includes a pixel (pixel of interest) at each pixel position and neighboring pixels, and determines whether the gradation of the pixel of interest belongs to the low gradation range, the medium gradation range, or the high gradation range, based on areal gradation (e.g., average pixel value) in the patch image. The size of the patch image may be as large as a dither matrix, or may be about 3×3 pixels, for example. To avoid overcorrection, the gradation determination unit 1105 may determine the gradation range at each pixel position by receiving feedback of the corrected image data, instead of using the image data before correction. For example, if the areal gradation in the patch image is greater than a first threshold, the gradation range of the pixel of interest is classified as the high gradation range. If the areal gradation in the patch image is smaller than or equal to the first threshold and greater than a second threshold (first threshold>second threshold), the gradation range of the pixel of interest is classified as the medium gradation range. If the areal gradation in the patch image is smaller than or equal to the second threshold, the gradation range of the pixel of interest is classified as the low gradation range. The gradation determination unit 1105 notifies the per-gradation correction unit 1106 of the results of determining the gradation range for each pixel position.

The per-gradation correction unit 1106 has a correction table that holds a reference light amount correction value, which is predetermined for each of the high gradation range, the medium gradation range, and the low gradation range. Generally, the reference light amount correction value for the high gradation range indicates a negative light amount correction value, and the sign thereof being negative means that the light amount is to be decreased. The reference light amount correction value for the low gradation range indicates a positive light amount correction value, and the sign thereof being positive means that the light amount is to be increased. The reference light amount correction value for the medium gradation range may be zero. The per-gradation correction unit 1106 obtains, by referencing the correction table, the reference light amount correction value corresponding to the gradation range of which the per-gradation correction unit 1106 was notified by the gradation determination unit 1105 for each of the pixel positions of abnormal spots indicated by the spot correction value C. Next, the per-gradation correction unit 1106 calculates a light amount correction value D based on the obtained reference light amount correction value and the spot shift amount indicated by the spot correction value C. For example, the light amount correction value D may be the product of the reference light amount correction value and a coefficient corresponding to the spot shift amount. To calculate the light amount correction value D, the per-gradation correction unit 1106 may also have a coefficient table or a relationship equation that defines the relationship between the spot shift amount and the coefficient. The per-gradation correction unit

1106 then outputs the calculated light amount correction value D to the image correction unit 1109. Note that the light amount correction value D may be zero for a pixel position where no abnormal spot is detected.

The calculation unit 1107 calculates a light amount correction value E for each pixel position based on the light amount correction value A and the light amount correction value B. The light amount correction value E may be the sum of the light amount correction value A determined for the group to which the light-emitting element 602 corresponding to each pixel position belongs and the light amount correction value B determined for this light-emitting element 602. Typically, the light amount correction value E may be zero or a negative value. The calculation unit 1107 outputs the calculated light amount correction unit E to the image correction unit 1109.

The image correction unit 1109 determines a percentage of scaling the light amount at each pixel position based on the light amount correction value D input from the per-gradation correction unit 1106 and the light amount correction value E input from the calculation unit 1107. The image correction unit 1109 then increases or decreases the areal light amount at each pixel position by correcting the image data of a small image around the pixel position in accordance with the method that has been described in detail with reference to FIGS. 10A to 10C. The image correction unit 1109 outputs the corrected image data to the chip data conversion unit 803.

In the present embodiment, an unevenness in light amount is corrected by changing the pixel values in the image data at the stage before data output from the chip data conversion unit 803 to each light-emitting chip 400. Accordingly, the chip data conversion unit 803 can distribute the image data to the light-emitting chips 400 with a common control logic, regardless of the correction of the unevenness in light amount.

6. SUMMARY

Various embodiments of the technology according to the present disclosure have been described in detail above with reference to FIGS. 1 to 16. According to the above embodiments, the exposure head of the image-forming apparatus includes a plurality of light-emitting chips located at different positions in a first direction parallel with the axial direction of the photosensitive member, and each of the plurality of light-emitting chips includes an array of a plurality of light-emitting elements arranged at least in the first direction. The correction chart that is used to correct an unevenness in light amount in the exposure head includes a plurality of regions arranged in a second direction perpendicular to the first direction, and a first reference mark and a second reference mark that are located on one side and the other side, respectively, of the plurality of regions in the second direction. The first and second reference marks represent a boundary between adjoining light-emitting chips among the plurality of light-emitting chips. Accordingly, the image-forming apparatus can precisely determine the boundary between the light-emitting chips in a read image of the correction chart based on the positions of the first reference mark and the corresponding second reference mark when generating correction data for correcting an unevenness in light amount based on the read image. This makes it possible to capture with high accuracy the position of a light-emitting element at which a local unevenness in light amount is occurring in each light-emitting chip, thus improving performance of the correction of the unevenness in light amount. In the above embodiment, a boundary of a partial region may be determined by means of a simple geometric operation based on a line segment connecting a representative position of a first reference mark to a representative position of a corresponding second reference mark. Therefore, the boundary of the partial region can be precisely determined at a small computational cost without requiring a complex algorithm.

In the above embodiment, the first and second reference marks may be formed as a result of effective light-emitting elements at least at one end in the first direction of each light-emitting chip. According to this configuration, an end point of an exposure range of each light-emitting chip (i.e., a boundary position of a partial region to be extracted from the read image) can be directly indicated by the reference marks.

In the above embodiment, the plurality of regions may include at least a region for measuring an error in light amount per light-emitting element or per group of light-emitting elements within each light-emitting chip, and a region for measuring a fluctuation in spot size in an imaging plane of light. These regions may be arranged in the circumferential direction of the photosensitive member, i.e., the transport direction of a sheet on which an image is to be formed. If many regions are thus arranged in the sheet transport direction in the correction chart, there is a concern that the effect of slight skewing of the sheet when the image of the correction chart is read may result in a relatively significant shift of boundary positions. However, in the above embodiment, the reference marks are printed on both sides of the plurality of regions, thus making it possible to precisely determine the boundaries between the light-emitting chips in the read image of the correction chart, even if the sheet skews.

For example, two of the plurality of regions have different gradations belonging to the medium gradation range, and a light amount distribution in the medium gradation range in the first direction of each light-emitting chip may be derived based on the results of measuring the density in partial regions of these two regions. Since the density in the medium gradation range is substantially unaffected by the presence or absence of an enlarged imaging spot, correction data that enables fine correction of an unevenness in light amount can be generated by measuring an error in light amount using the light amount distribution in the medium gradation range. Another two of the plurality of regions may have different gradations belonging to the high gradation range, and yet another two of the regions may have different gradations belonging to the low gradation range. A light amount distribution in the high gradation range and a light amount distribution in the low gradation range in the first direction of each light-emitting chip may be derived based on the results of measuring the density in partial regions of these regions. The light amount distributions in the high gradation range and the low gradation range are likely to be affected by an enlarged imaging spot. Therefore, correction data can be generated that also enables correction of an unevenness in light amount due to an abnormal spot by detecting an abnormal spot using the light amount distributions and measuring a fluctuation in spot size.

Although the above embodiment uses specific numerical values for description, these specific numerical values are examples, and the present invention is not limited to the specific numerical values used in the embodiment. Specifically, the number of light-emitting chips provided on one printed circuit board is not limited to twenty, and may be any number of one or more. The size of the array of the light-emitting elements in each light-emitting chip 400 is not limited to 4 rows×748 columns, and may be any other size. The pitch of the light-emitting elements in the circumferential direction and the pitch thereof in the axial direction are not limited to about 21.16 m and about 5 m, respectively, and may take any other value.

7. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-138341, filed on Aug. 31, 2022, which is hereby incorporated by reference herein in its entirety.

What is claimed is:

1. An image-forming apparatus comprising:

an image-forming unit including a photosensitive member and an exposure head configured to expose the photosensitive member with light in accordance with image data;

a generating unit configured to cause the image-forming unit to form an image of a correction chart, and generate correction data for correcting an unevenness in light amount of the exposure head using a read image of the correction chart obtained by optically reading the formed image; and a correction unit configured to correct the image data input to the image-forming unit based on the correction data generated by the generating unit, wherein the exposure head includes a plurality of light-emitting chips located at different positions in a first direction parallel with an axial direction of the photosensitive member, each of the plurality of light-emitting chips including an array of a plurality of light-emitting elements arranged at least in the first direction, the correction chart includes:

a plurality of regions arranged in a second direction perpendicular to the first direction and having different gradations, at least one first reference mark located on one side of the plurality of regions in the second direction and indicating a boundary between adjoining light-emitting chips among the plurality of light-emitting chips, and at least one second reference mark located on the other side of the plurality of regions in the second direction and indicating the boundary between adjoining light-emitting chips among the plurality of light-emitting chips, and the generating unit is configured to:

determine partial regions respectively formed by the plurality of light-emitting chips within the plurality of regions based on positions of the first reference mark and the corresponding second reference mark in the read image of the correction chart, and generate the correction data based on a result of measuring a density in each of the determined partial regions.

2. The image-forming apparatus according to claim 1, wherein the generating unit is configured to determine a boundary between the partial regions based on a line segment connecting a representative position of the first reference mark to a representative position of the corresponding second reference mark.

3. The image-forming apparatus according to claim 2, wherein the first reference mark and the second reference mark are formed by at least an effective light-emitting element at one end, in the first direction, of each of the plurality of light-emitting chips emitting light.

4. The image-forming apparatus according to claim 1, wherein the plurality of regions include:

at least one region for measuring an error in light amount per light-emitting element or per group of light-emitting elements in each light-emitting chip; and at least one region for measuring a fluctuation in a spot size of light from the exposure head on an imaging plane.

5. The image-forming apparatus according to claim 4, wherein the at least one region for measuring the error in light amount per light-emitting element or per group of light-emitting elements in each light-emitting chip includes two regions having different gradations belonging to a medium gradation range.

6. The image-forming apparatus according to claim 5, wherein the generating unit is configured to measure the error in light amount per light-emitting element or per group of light-emitting elements, using a light amount distribution in the medium gradation range of each light-emitting chip in the first direction, the light amount distribution being derived based on the result of measuring the density in partial regions of the two regions in the medium gradation range.

7. The image-forming apparatus according to claim 4, wherein the at least one region for measuring the fluctuation in spot size includes two regions having different gradations belonging to a high gradation range, and two regions having different gradations belonging to a low gradation range.

8. The image-forming apparatus according to claim 7, wherein the generating unit is configured to measure the fluctuation in spot size using light amount distributions in the high gradation range and the low gradation range in each light-emitting chip in the first direction, the light amount distributions being derived based on the result of measuring the density in partial regions of the two regions in the high gradation range and the two regions in the low gradation range.

9. The image-forming apparatus according to claim 1, further comprising a reading unit configured to optically read the image of the correction chart formed by the image-forming unit to generate the read image of the correction chart.

10. A correction chart for use in correction of an unevenness in light amount of an exposure head of an image-forming apparatus, the image-forming apparatus including:

an image-forming unit including a photosensitive member and the exposure head configured to expose the photosensitive member with light in accordance with image data;

a generating unit configured to cause the image-forming unit to form an image of the correction chart, and generate correction data for correcting the unevenness in light amount using a read image of the correction chart obtained by optically reading the formed image; and a correction unit configured to correct the image data input to the image-forming unit based on the correction data generated by the generating unit, wherein the exposure head includes a plurality of light-emitting chips located at different positions in a first direction parallel with an axial direction of the photosensitive member, each of the plurality of light-emitting chips including an array of a plurality of light-emitting elements arranged at least in the first direction, the correction chart comprising:

a plurality of regions arranged in a second direction perpendicular to the first direction and having different gradations, at least one first reference mark located on one side of the plurality of regions in the second direction and indicating a boundary between adjoining light-emitting chips among the plurality of light-emitting chips, and at least one second reference mark located on the other side of the plurality of regions in the second direction and indicating the boundary between adjoining light-emitting chips among the plurality of light-emitting chips.

11. A method for correcting an unevenness in light amount of an exposure head in an image-forming apparatus including an image-forming unit including a photosensitive member and the exposure head configured to expose the photosensitive member with light in accordance with image data, wherein the exposure head includes a plurality of light-emitting chips located at different positions in a first direction parallel with an axial direction of the photosensitive member, each of the plurality of light-emitting chips including an array of a plurality of light-emitting elements arranged at least in the first direction, the method comprising:

causing the image-forming unit to form an image of a correction chart;

generating correction data for correcting the unevenness in light amount of the exposure head using a read image of the correction chart obtained by optically reading the formed image; and correcting the image data input to the image-forming unit based on the generated correction data, wherein the correction chart includes:

a plurality of regions arranged in a second direction perpendicular to the first direction and having different gradations, at least one first reference mark located on one side of the plurality of regions in the second direction and indicating a boundary between adjoining light-emitting chips among the plurality of light-emitting chips, and at least one second reference mark located on the other side of the plurality of regions in the second direction and indicating the boundary between adjoining light-emitting chips among the plurality of light-emitting chips, and the generating of the correction data includes:

determining partial regions respectively formed by the plurality of light-emitting chips within the plurality of regions based on positions of the first reference mark and the corresponding second reference mark in the read image of the correction chart, and generating the correction data based on a result of measuring a density in each of the determined partial regions.

* * * * *